United States Patent
Brunn et al.

(10) Patent No.: US 10,972,443 B2
(45) Date of Patent: Apr. 6, 2021

(54) SYSTEM AND METHOD FOR ENCRYPTED DOCUMENT CO-EDITING

(71) Applicant: International Business Machines Corporation, Armonk, NY (US)

(72) Inventors: Jonathan F. Brunn, Logan, UT (US); Melissa N. Fritcher, Durham, NC (US); John Girata, Jr., Raleigh, NC (US); Matthew S. Hunt, Oakland, CA (US); Marshall A. Lamb, Raleigh, NC (US); Kelvin T. Ly, Middleburg, FL (US); David P. Zmick, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 15/450,205

(22) Filed: Mar. 6, 2017

(65) Prior Publication Data
US 2018/0255034 A1    Sep. 6, 2018

(51) Int. Cl.
*H04L 29/06* (2006.01)
*H04L 9/08* (2006.01)
*H04L 29/08* (2006.01)

(52) U.S. Cl.
CPC ........ *H04L 63/0478* (2013.01); *H04L 9/0891* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 5,604,801 A | | 2/1997 | Dolan et al. |
| 5,787,175 A | * | 7/1998 | Carter ................. G06F 21/6209 707/999.008 |
| 5,897,648 A | * | 4/1999 | Henderson ............ G06F 3/0488 178/18.01 |
| 6,243,816 B1 | | 6/2001 | Fang et al. |
| 6,957,330 B1 | | 10/2005 | Hughes |
| 2005/0044294 A1 | * | 2/2005 | Vo ........................... H03M 7/30 710/68 |
| 2012/0185759 A1 | * | 7/2012 | Balinsky ............. G06F 21/6227 715/209 |

(Continued)

OTHER PUBLICATIONS

Qin, Zhiguang & Xiong, Hu & Wu, Shikun & Batamuliza, Jennifer. (2015). A Survey of Proxy Re-Encryption for Secure Data Sharing in Cloud Computing. IEEE Transactions on Services Computing. 1939-1374. 10.1109/TSC.2016.2551238.*

(Continued)

*Primary Examiner* — Jeffrey L Williams
(74) *Attorney, Agent, or Firm* — Reza Sarbakhsh

(57) ABSTRACT

A computer-implemented method, computer program product, and computing system is provided for encrypted document co-editing. In an implementation, a method may include receiving, at a first computing device, a first encrypted change set for a co-editable data object from a client, the first encrypted change set being encrypted by a first key. The method may include requesting a second key for re-encrypting the first encrypted change set. The method may include re-encrypting the first encrypted change set to generate a second encrypted change set using the second key.

20 Claims, 14 Drawing Sheets

(56) References Cited

U.S. PATENT DOCUMENTS

| | | | | |
|---|---|---|---|---|
| 2014/0115332 | A1* | 4/2014 | Crosbie | G06F 17/2288 |
| | | | | 713/167 |
| 2014/0164790 | A1 | 6/2014 | Dodgson et al. | |
| 2015/0358298 | A1* | 12/2015 | Crosbie | G06F 17/2288 |
| | | | | 713/167 |
| 2016/0224799 | A1* | 8/2016 | Uzun | G06F 21/6227 |
| 2016/0321225 | A1* | 11/2016 | Keslin | G06F 16/176 |
| 2018/0025026 | A1* | 1/2018 | Shaw, Jr. | G06F 16/183 |
| | | | | 707/626 |
| 2018/0062852 | A1* | 3/2018 | Schmahmann | G06F 17/30165 |
| 2018/0121402 | A1* | 5/2018 | Keslin | G06F 16/176 |
| 2018/0255034 | A1* | 9/2018 | Brunn | H04L 63/0478 |

OTHER PUBLICATIONS

Chunbo Ma and Jun Ao. 2009. Group-based proxy re-encryption scheme. In Proceedings of the 5th international conference on Emerging intelligent computing technology and applications (ICIC'09), De-Shuang Huang, Kang-Hyun Jo, Hong-Hee Lee, Hee-Jun Kang, and Vitoantonio Bevilacqua (Eds.). Springer-Verlag, Berlin, Heid.*

P. K. Tysowski and M. A. Hasan, "Hybrid Attribute- and Re-Encryption-Based Key Management for Secure and Scalable Mobile Applications in Clouds," in IEEE Transactions on Cloud Computing, vol. 1, No. 2, pp. 172-186, Jul.-Dec. 2013.doi: 10.1109/TCC.2013.11 (Year: 2013).*

D. H. Tran, H. Nguyen, W. Zha and W. K. Ng, "Towards security in sharing data on cloud-based social networks," 2011 8th International Conference on Information, Communications & Signal Processing, Singapore, 2011, pp. 1-5.doi: 10.1109/ICICS.2011.6173582 (Year: 2011).*

Renjith P, Sabitha S, "Survey on Data Sharing and Re-Encryption in Cloud", 2013, IJARCET, vol. 2, Issue 2, Feb. 2013, p. 477-480. (Year: 2013).*

Chen, et al., "Secure Group Key Management Using Uni-Directional Proxy Re Encryption Schemes", IEEE INOFCOM, 2011, p. 1952-1960. (Year: 2011).*

Tysowski, P.K., and Hasan, M. A.2011. Re-Encryption Based Key Management towards Secure and Scalable Mobile Applications in Clouds. IACR Cryptology ePrint Archive, pp. 1-10. (Year: 2011).*

Telstra, "Conference Room Disrupted: The new age of virtual collaboration", Jun. 23, 2016, https://qz.com/714003/conference-room-disrupted-the-new-age-of-virtual-collaboration-2; p. 1-3. (Year: 2016).*

Clarity Innovations, "Online Collaborative Tools in Education", Dec. 2013, p. 1-94. (Year: 2013).*

VNET, "Guidelines for Effective Web Conferences", Jul. 2008, Virginia Department of Education, p. 1-8. (Year: 2008).*

Keith, Elise, "26 Tools for Online Brainstorming and Decision Making in Meetings", Sep. 25, 2015, Lucid Meetings Blog, https://blog.lucidmeetings.com/25-tools-for-online-brainstorming-and-decision-making-in-meetings; p. 1-32. (Year: 2015).*

Cisco, "Create a Collaborative and Productive Web Meeting Experience", Cisco WebEx, 2015, p. 1-2. (Year: 2015).*

Doriano Carta, "5 Ways to Collaborate on Documents Online in Real Time", Feb. 21, 2009, https://mashable.com/2009/02/21/online-document-collaboration/ (Year: 2009).*

Blaze et al., "Divertible Protocols and Atomic Proxy Cryptography," AT&T Labs—Research, Florham Park, NJ, International Conference on the Theory and Applications of Cryptographic Techniques, Springer Berlin Heidelberg, 1998, pp. 1-18.

Ateniese et al., "Improved Proxy Re-Encryption Schemes with Applications to Secure Distributed Storage," ACM Transactions on Information and System Security, vol. 9, No. 1, Feb. 2006, pp. 1-30.

Naidu et al., "Confident Multi-Owner File Partaking for Vibrant Units in the Cloud," International journal of Research in Computer and Communication Technology, vol. 3, Issue 11, Nov. 2014, pp. 1691-1695.

Brandom, "Box Is Launching Encryption Keys That Only You Will Hold," The Verge, Feb. 10, 2015, http://www.theverge.com/2015/2/10/8012767/box-encryption-enterprise-key-management-subpoena, pp. 1-10.

* cited by examiner

400

402 — receiving, at a first computing device, a first encrypted change set for a co-editable data object from a client, the first encrypted change set being encrypted by a first key 404 — requesting a second key for re-encrypting the first encrypted change set 406 — re-encrypting the first encrypted change set to generate a second encrypted change set using the second key

700

702 — receiving a request from the client for one or more of the second encrypted change set and the second encrypted version of the co-editable data object 704 — providing for one or more of the second encrypted change set and the second encrypted version of the co-editable data object to the client

SYSTEM AND METHOD FOR ENCRYPTED DOCUMENT CO-EDITING

TECHNICAL FIELD

The present disclosure generally relates to a system and method for document co-editing, and more particularly relates to encrypted document co-editing.

BACKGROUND

Various collaboration systems exist for enabling individuals to engage in collaborate activities, such as working together on projects, sharing information, and the like. Collaboration systems can be particularly useful in allowing geographically dispersed individuals to interact and work with one another. Using various different collaboration systems, or multi-functional collaboration systems, individuals who are geographically remote from one another may, for example, engage in common work projects, for example, using online team work spaces, participate in interactive discussions, for example, using teleconferencing or video conferencing systems, and engage in meetings, for example, using electronic meeting systems that allow for presentations, lectures, seminars, and the like.

With the increase in cloud-based file storage and other cloud services, adding greater security features to these files and services has become increasingly desirable. However, many solutions fail to secure content stored in cloud-based file storage from unauthorized access or fail to prevent cloud service providers from accessing content or providing content to third-parties, either intentionally or unintentionally. Therefore, it may be of interest to provide greater security for cloud-based file storage through an encryption scheme that protects content from access by a cloud service provider.

SUMMARY OF DISCLOSURE

According to an implementation, a computer-implemented method may include receiving, at a first computing device, a first encrypted change set for a co-editable data object from a client, the first encrypted change set being encrypted by a first key. The method may include requesting a second key for re-encrypting the first encrypted change set. The method may include re-encrypting the first encrypted change set to generate a second encrypted change set using the second key.

One or more of the following features may be included. The method may further include requesting a version of the co-editable data object. The method may include receiving a first encrypted version of the co-editable data object encrypted with the first key from the client. The method may include requesting the second key for re-encrypting the first encrypted version of the co-editable data object. The method may include re-encrypting the first encrypted version of the co-editable data object to generate the second encrypted version of the co-editable data object using the second key. The method may also include receiving a request from the client for one or more of the second encrypted change set and the second encrypted version of the co-editable data object. The method may include providing for one or more of the second encrypted change set and the second encrypted version of the co-editable data object to the client. The method may further include associating a version identifier with the second encrypted version of the co-editable data object. The method may include marking the second encrypted change set with the version identifier associated with the second encrypted version of the co-editable data object re-encrypted by the first computing device.

The method may also include determining that a new version of the co-editable data object is necessary. The method may include providing the second encrypted change set marked with the first version identifier to the client when the marked second encrypted change set is necessary to complete the new version of the co-editable data object. The method may include receiving the new version of the co-editable data object from the client. In some embodiments, the second encrypted change set may be marked with one or more position indicators that may indicate the position of one or more changes within the co-editable data object. The method may further include receiving a first encrypted index listing encrypted with the first key from the client, the first encrypted index listing defining one or more boundaries for the one or more position indicators within the co-editable data object. The method may include requesting the second key for re-encrypting the first encrypted index listing. The method may include re-encrypting the first encrypted index listing to generate a second encrypted index listing using the second key. The method may include providing the second encrypted index listing to the client. The method may include receiving a request from the client for the second encrypted change set based upon, at least in part, the second encrypted index listing.

According to another implementation, a computer program product may include a non-transitory computer readable storage medium having a plurality of instructions stored on it. When executed by a processor, the instructions may cause the processor to perform operations including receiving, at a first computing device, a first encrypted change set for a co-editable data object from a client, the first encrypted change set being encrypted by a first key. Instructions may be included for requesting a second key for re-encrypting the first encrypted change set. Instructions may be included for re-encrypting the first encrypted change set to generate a second encrypted change set using the second key.

One or more of the following features may be included. Instructions may also be included for requesting a version of the co-editable data object. Instructions may be included for receiving a first encrypted version of the co-editable data object encrypted with the first key from the client. Instructions may be included for requesting the second key for re-encrypting the first encrypted version of the co-editable data object. Instructions may be included for re-encrypting the first encrypted version of the co-editable data object to generate a second encrypted version of the co-editable data object using the second key. Instructions may also be included for receiving a request from the client for one or more of the second encrypted change set and the second encrypted version of the co-editable data object. Instructions may be included for providing for one or more of the second encrypted change set and the second encrypted version of the co-editable data object to the client. Instructions may further be included for associating a version identifier with the second encrypted version of the co-editable data object. Instructions may be included for marking the second encrypted change set with the version identifier associated with the second encrypted version of the co-editable data object re-encrypted by the first computing device.

Instructions may also be included for determining that a new version of the co-editable data object is necessary. Instructions may be included for providing the second encrypted change set marked with the first version identifier to the client when the marked second encrypted change set is necessary to complete the new version of the co-editable data object. Instructions may be included for receiving the new version of the co-editable data object from the client. In some embodiments, the second encrypted change set may be marked with one or more position indicators that may indicate the position of one or more changes within the co-editable data object. Instructions may further be included for receiving a first encrypted index listing encrypted with the first key from the client, the first encrypted index listing defining one or more boundaries for the one or more position indicators within the co-editable data object. Instructions may be included for requesting the second key for re-encrypting the first encrypted index listing. Instructions may be included for re-encrypting the first encrypted index listing to generate a second encrypted index listing using the second key. Instructions may be included for providing the second encrypted index listing to the client. Instructions may be included for receiving a request from the client for the second encrypted change set based upon, at least in part, the second encrypted index listing.

According to another implementation, a computing system may include a processor and a memory module coupled with the processor. The processor may be configured for receiving, at a first computing device, a first encrypted change set for a co-editable data object from a client, the first encrypted change set being encrypted by a first key. The processor may be configured for requesting a second key for re-encrypting the first encrypted change set. The processor may also be configured for re-encrypting the first encrypted change set to generate a second encrypted change set using the second key.

One or more of the following features may be included. The processor may be further configured for requesting a version of the co-editable data object. The processor may be configured for receiving a first encrypted version of the co-editable data object encrypted with the first key from the client. The processor may be configured for requesting the second key for re-encrypting the first encrypted version of the co-editable data object. The processor may be configured for re-encrypting the first encrypted version of the co-editable data object to generate a second encrypted version of the co-editable data object using the second key. The processor may also be configured for receiving a request from the client for one or more of the second encrypted change set and the second encrypted version of the co-editable data object. The processor may be configured for providing for one or more of the second encrypted change set and the second encrypted version of the co-editable data object to the client. The processor may be further configured for associating a version identifier with the second encrypted version of the co-editable data object. The processor may be configured for marking the second encrypted change set with the version identifier associated with the second encrypted version of the co-editable data object re-encrypted by the first computing device.

The processor may also be configured for determining that a new version of the co-editable data object is necessary. The processor may be configured for providing the second encrypted change set marked with the first version identifier to the client when the marked second encrypted change set is necessary to complete the new version of the co-editable data object. The processor may be configured for receiving the new version of the co-editable data object from the client. In some embodiments, the second encrypted change set may be marked with one or more position indicators that may indicate the position of one or more changes within the co-editable data object. The processor may be further configured for receiving a first encrypted index listing encrypted with the first key from the client, the first encrypted index listing defining one or more boundaries for the one or more position indicators within the co-editable data object. The processor may be configured for requesting the second key for re-encrypting the first encrypted index listing. The processor may be configured for re-encrypting the first encrypted index listing to generate a second encrypted index listing using the second key. The processor may be configured for providing the second encrypted index listing to the client. The processor may be configured for receiving a request from the client for the second encrypted change set based upon, at least in part, the second encrypted index listing.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF EXAMPLE EMBODIMENTS

Figure 1:
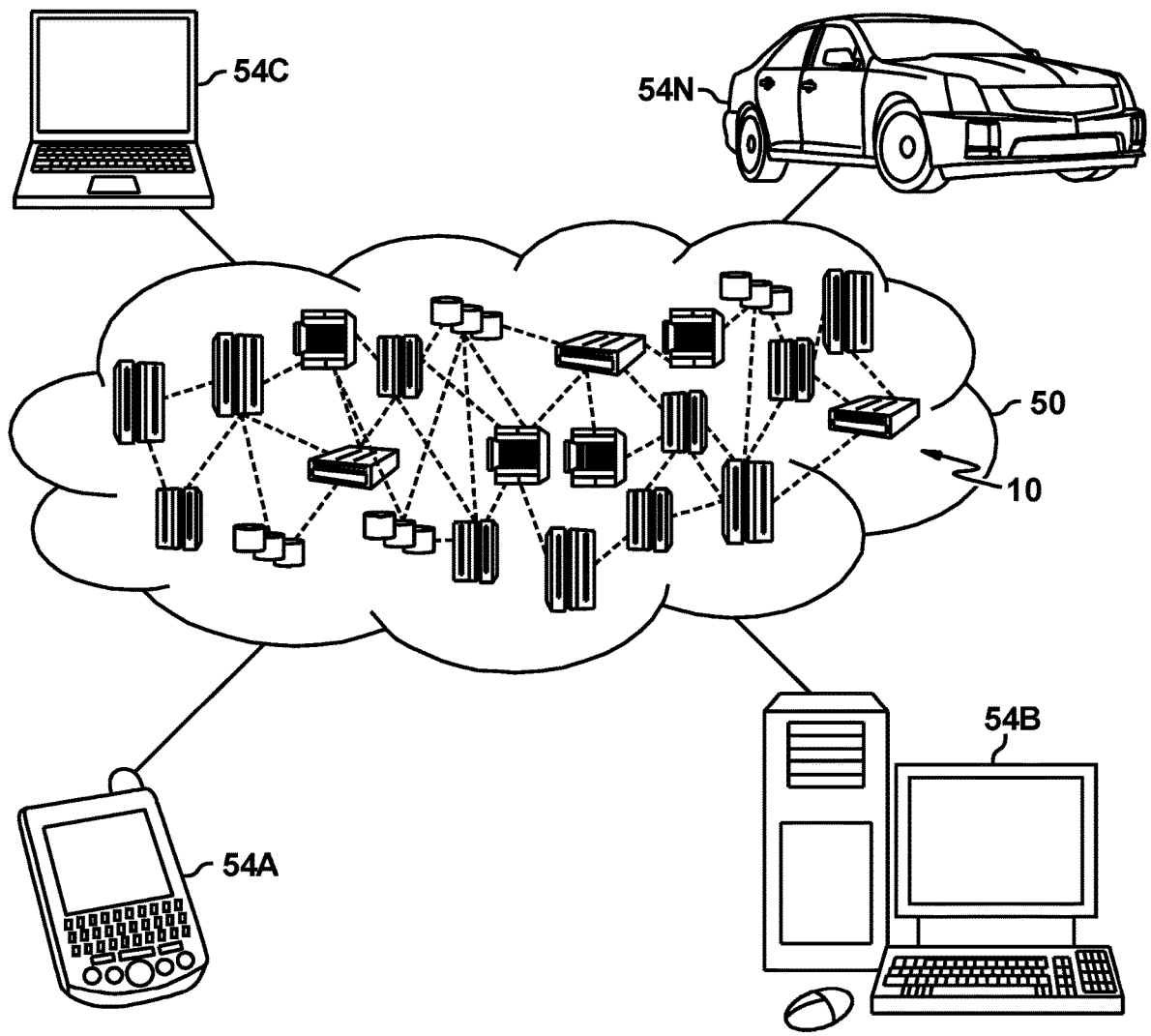
FIG. 1 is a diagrammatic view of a cloud computing environment including a computing device that executes a co-editing process according to an implementation of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. An example of such a cloud model may include at least five characteristics, at least three service models, and at least four deployment models.

Characteristics may be as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models may be as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models may be as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative example cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
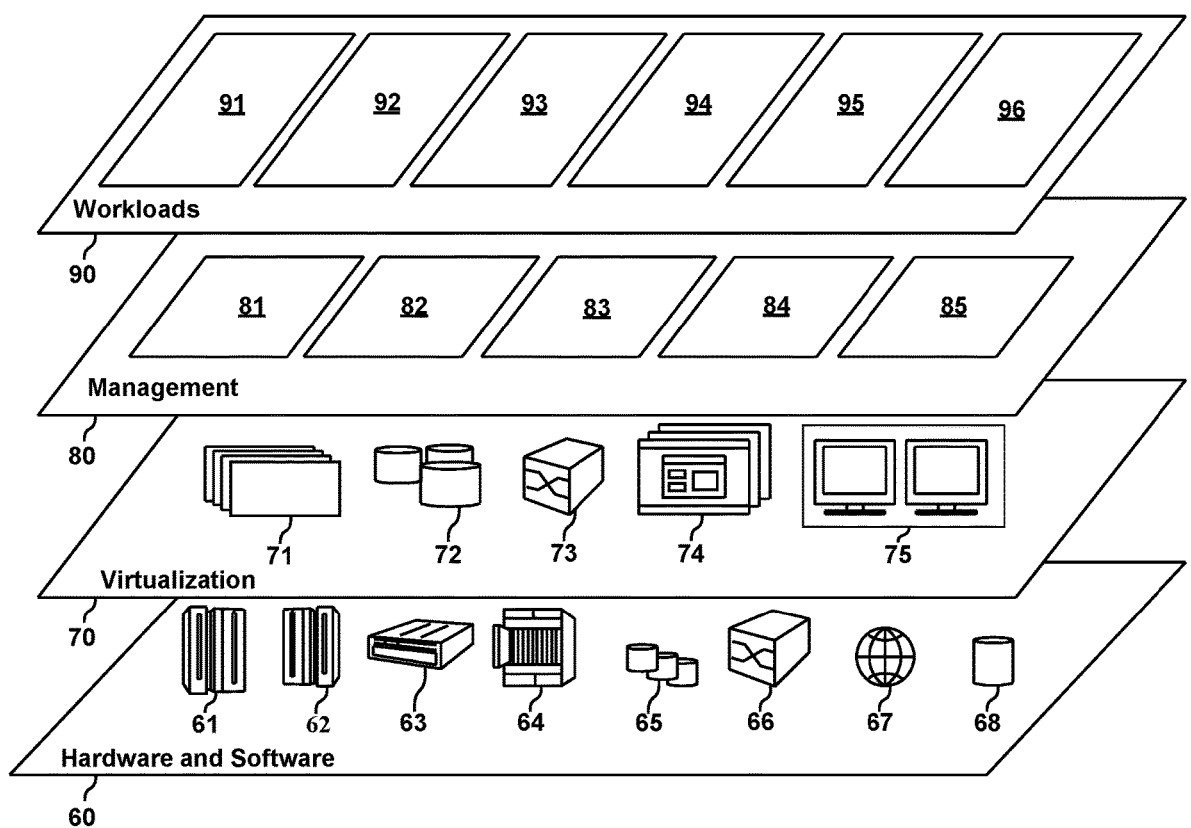
FIG. 2 is a diagrammatic view of functional abstraction layers provided by cloud computing environment for executing a co-editing process according to an implementation of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and co-editing process 96.

Figure 3:
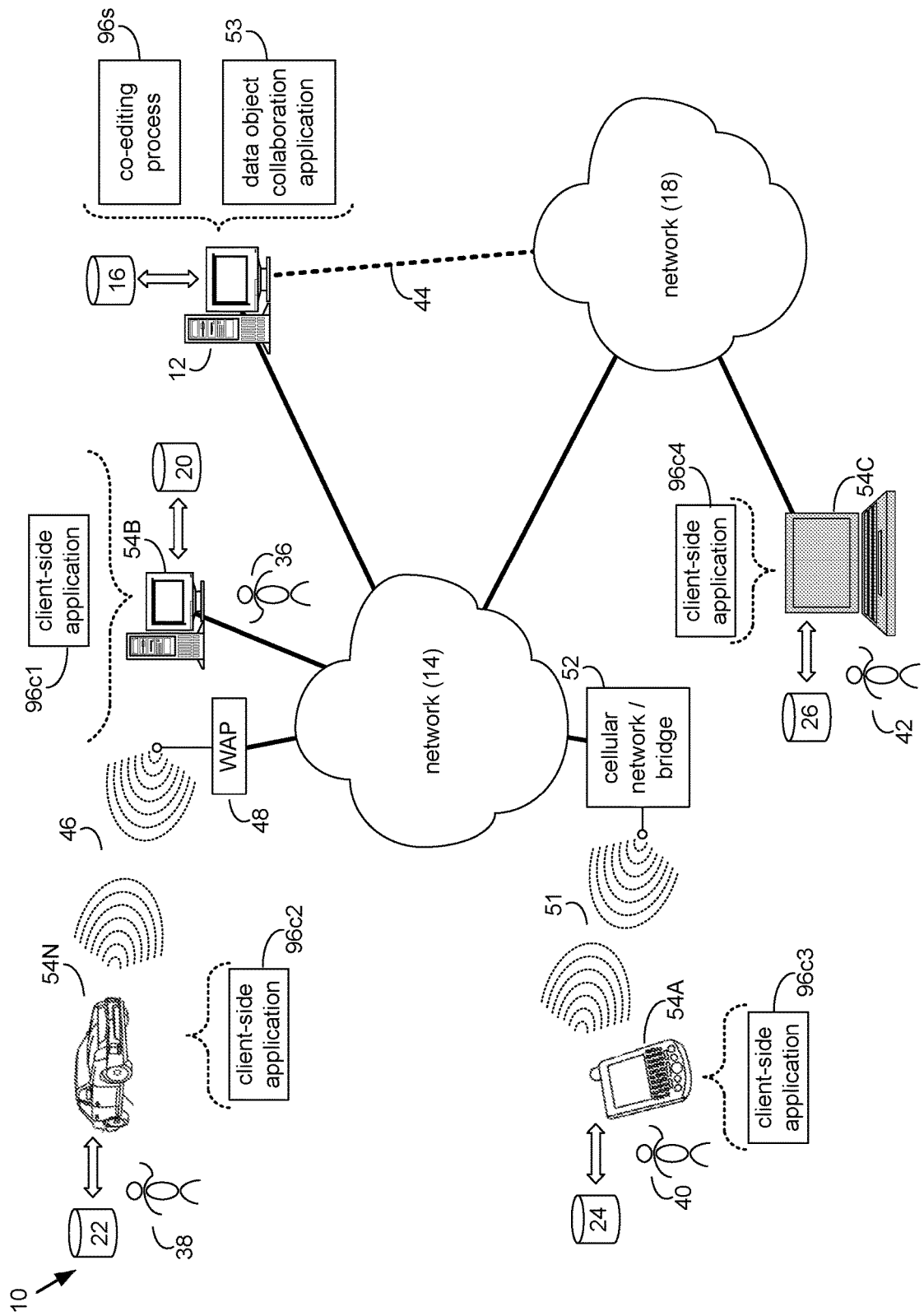
FIG. 3 is a diagrammatic view of a distributed computing network including a computing device that executes a co-editing process according to an implementation of the present disclosure.

Referring also to FIG. 3, there is shown co-editing process 96 in one illustrative example environment. For the following discussion, it is intended to be understood that co-editing process 96 may be implemented in a variety of ways. For example, co-editing process 96 may be implemented as a workload as described above, and additionally and/or alternatively as a server-side process, a client-side process, or a server-side/client-side process.

For example, co-editing process 96 may be implemented as a purely server-side process via co-editing process 96s. Alternatively, co-editing process 96 may be implemented as a purely client-side process via one or more of client-side application 96c1, client-side application 96c2, client-side application 96c3, and client-side application 96c4. Alternatively still, co-editing process 96 may be implemented as a server-side/client-side process via server-side co-editing process 96s in combination with one or more of client-side application 96c1, client-side application 96c2, client-side application 96c3, and client-side application 96c4. In such an example, at least a portion of the functionality of co-editing process 96 may be performed by co-editing process 96s and at least a portion of the functionality of co-editing process 96 may be performed by one or more of client-side application 96c1, 96c2, 96c3, and 96c3.

Accordingly, co-editing process 96 as used in this disclosure may include any combination of co-editing process 96s, client-side application 96c1, client-side application 96c2, client-side application 96c3, and client-side application 96c4.

Figure 4:
FIG. 4 is a flowchart of the co-editing process of FIG. 1, according to an implementation of the present disclosure.
Figure 4:
Figure 4:

Referring also to FIG. 4, and as will be discussed in greater detail below, co-editing process 96 may receive 402, at a first computing device, a first encrypted change set for a co-editable data object from a client, the first encrypted change set being encrypted by a first key. Co-editing process 96 may request 404 a second key for re-encrypting the first encrypted change set. Co-editing process 96 may re-encrypt 406 the first encrypted change set to generate a second encrypted change set using the second key.

Co-editing process 96s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of co-editing process 96s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 96c1, 96c2, 96c3, 96c4 may include but are not limited to, one or more of a data object collaboration application, a web browser (e.g., which may execute a thin client, applet, or the like), or a specialized application (e.g., an application running on a mobile platform). The instruction sets and subroutines of client-side application 96c1, 96c2, 96c3, 96c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access co-editing process 96 directly through network 14 or through secondary network 18. Further, co-editing process 96 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 51 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, co-editing process 96 may communicate with, interact with, and/or include a component or module of a data object collaboration application (e.g., data object collaboration application 53). As is generally known, a data object collaboration application (e.g., data object collaboration application 53) may generally facilitate co-editable data object collaboration between individuals operating computing devices as participants in a collaborative session. For example, data object collaboration application 53 may facilitate data object co-editing between collaborative session participants. In some embodiments, a collaborative session may include at least one participant. In some embodiments, a collaborative session may include two or more participants. In some embodiments, data object collaboration application 53 may include, and/or may interact with, for example, a co-editable data object processing application, a document processing application, a word processing application, a presentation processing application, and/or a spreadsheet processing application. An example of data object collaboration application 53 may include, but is not limited to, IBM® Connections Docs. (IBM is a registered trademark of International Business Machine Corporation in the United States, other countries, or both). It should be appreciated that while co-editing process 96 and data object collaboration application 53 have been depicted as residing on the same computing device (i.e., server computer 12), this is only for the purpose of illustrative simplicity. In some embodiments, co-editing process 96 and data object collaboration application 53 may often reside on, and be executed by, separate computing devices. In some such embodiments, the respective computing devices executing co-editing application 96 and data object collaboration application 53 may be under the partial, or exclusive, control of the same entity or of different entities.

In an embodiment, the instruction sets and subroutines of electronic data object collaboration application 53 may be stored, e.g., on storage device 16 associated with server computer 12, which executes electronic data object collaboration application 53, and/or another suitable storage device. Further, users (e.g., one or more of users 36, 38, 40, 42) may access electronic data object collaboration application 53 in order to participate in an electronic data object collaboration session (an electronic meeting or other communication session type). The users may access electronic data object collaboration application 53 via one or more suitable applications, such as client side applications 96c1-96c4 (e.g., which may include a web browser, a client electronic meeting application, or another application) and/or via a different application (not shown). Additionally, while some users are depicted as being connected with server computer 12 (and therefore with electronic data object collaboration application 53) via network 14, which may include the Internet, in other embodiments, one or more users may be directed connected to server computer 12 and/or connected with server computer 12 via, e.g., a local area network and/or similar connection.

As generally discussed above, a portion and/or all of the functionality of co-editing process 96 may be provided by one or more of client side applications 96c1-96c4. For example, in some embodiments co-editing process 96 (and/or client-side functionality of co-editing process 96) may be included within and/or interactive with client-side applications 96c1-96c4, which may include client side electronic communication applications, web browsers, or another application. Various additional/alternative configurations may be equally utilized.

As generally discussed above with reference to FIG. 4, co-editing process 96 may receive 402, at a first computing device, a first encrypted change set for a co-editable data object from a client, the first encrypted change set being encrypted by a first key. A first computing device, as used herein may include, but is not limited to, a personal computer, a server computer, a series of server computers, a mini computer, a mainframe computer, or a dedicated network device. Examples of the first computing device may include computing device 12 as shown in FIG. 1 and/or server 63 as shown in FIG. 3. However, other computing devices are within the scope of the present disclosure.

For discussion purposes, the terms "first computing device", "co-editable data object server", and "document editing server" may be used interchangeably within the scope of the present disclosure without limiting the first computing device to a server or a specific data object or document co-editing server. In some embodiments, co-editable data object server may manage collaborative editing of a co-editable data object between a plurality of users and/or clients. For example, co-editable data object server may receive changes to a co-editable data object made by the plurality of users and distribute the changes to each of the plurality of users and/or clients. A "co-editable data object" as used herein may include, but is not limited to, any electronic file or document such as a word processing, spreadsheet, or presentation document that may be created in and/or accessible for collaborative editing between a plurality of users. As will be discussed in greater detail below, one or more users of the plurality of users may edit or change content within and/or portions of the co-editable data object. Additionally and/or alternatively, while a co-editable data object may be described in various embodiments of the present disclosure, other data objects may be included. In some embodiments, "data objects", regardless of whether or not they are co-editable data objects, may be received from and/or distributed to a plurality of users and/or clients. In one example, a version of a data object may be received from and/or distributed to a plurality of users and/or clients for distributed version control. A "client" as used herein may include, but is not limited to, a hardware or software component that may access a service (e.g., SaaS) made available by another computing device, such as a server. Other computing devices are within the scope of the present disclosure. Examples of clients may include, but are not limited to, rich clients (i.e., clients that perform a portion of the data processing itself), thin clients (i.e., clients that use the resources of another computing device (such as a web application)), and/or hybrid clients (i.e., clients that perform a portion of the data processing and use resources of another computing device).

In some embodiments, a user via a client (e.g., a browser) may transmit one or more change sets or deltas to an intermediate co-editable data object server which may be used for collaborative editing. It will be appreciated that the term "client" may refer to a client application (including web application client executed via a web browser) and/or the computing device executing the client application. In some embodiments, the one or more change sets or deltas may be applied to a co-editable data object using operational transformations. In some embodiments, a co-editable data object server may collect input and changes from multiple clients and may coordinate the distribution of change sets and deltas to a co-editable data object automatically to clients through push technology, websockets and/or long polling from the clients. In some embodiments, data object collaborative editing sessions may be short and may, by having a dedicated document editing server, be scaled beyond what would be required if every delta and change needed to be persisted in the content server.

In some embodiments, and due to the use of eventual consistency in cloud-based computing solutions, the complex nature of operational transformations, and the short lived nature of most co-editing sessions, a co-editable data object server (which may be one of many in a distributed farm) may effectively master the co-editable data object for a short time during the collaborative editing session, coordinating changes from multiple users into a single whole.

In some embodiments, co-editable data object (e.g., document) may undergo a server side conversion before being pushed to a content server. This conversion process being may be performed in a co-editable data object server. In some embodiments, collaborative editing of a co-editable data object may provide co-editable data object server with access to the plaintext of the co-editable data object, and may hold onto it for long periods of time to efficiently apply the one or more change sets and/or deltas. For example, co-editable data object server may hold onto the plaintext of the co-editable data object as long as an editing session is open.

As described above, in some situations the use of a co-editable data object server may be at odds with the security goals of restricting access to the co-editable data object to authorized users. At least while co-editing of the document is occurring, the document editing server may have the co-editable data object or document plaintext. The plaintext of the co-editable data object may be open to forms of attack which first trick a user into beginning a editing session to get plaintext resident in the co-editable data object server, then using attacks or vulnerabilities in the co-editable data object server itself to gain access to the plaintext.

As will be described in greater detail below, in some embodiments, the present disclosure may provide greater security for cloud-based file storage through an encryption scheme that may protect content from unauthorized access (e.g., by a cloud service provider and/or unintended recipients). For example, embodiments of co-editing process 96 may communicate one or more change sets encrypted with a user specific key to a co-editable data object server. In some embodiments, co-editing process 96 may use a proxy re-encryption scheme to re-encrypt the encrypted change set with a key that is not known to the co-editable data object server. In some embodiments, co-editing process 96 may use a separate per version index listing to mark byte indexes of elements such as pages, sections, or other portions of a co-editable data object. In some embodiments, co-editing process 96 may mark one or more change sets with pages to apply byte-service techniques to serve partial co-editable data objects. In some embodiments, co-editing process 96 may periodically send complete versions from the clients when sufficient changes are detected and/or a client with a suitable connection is available. In some embodiments, co-editing process 96 may store change sets and/or versions of co-editable data objects which may be accessed by users, but may not be accessible by a cloud service provider.

In some embodiments, co-editing process 96 may interact with and/or include a key manager. A "key manager" as used with herein may include, but is not limited to, a hardware or software component configured to store and manage digital keys for encrypting and/or decrypting data based upon a cryptographic protocol. Examples of key managers may include, but are not limited to, hardware security modules (HSM) and encryption gateways. In some embodiments, the key manager may include or may be a portion of a comprehensive data security platform, such as IBM® Security Guardium. Encryption gateways may be hardware or software components that process incoming and outgoing data to encrypt and/or decrypt the data with a digital key. In some embodiments, the encryption gateway may be located in a network or within an IaaS cloud instance. In a centralized configuration, all data from a network may pass through an encryption gateway. In some embodiments, a plurality of encryption gateways may be deployed to realize the benefits of distributed computing available from a cloud computing environment. In some embodiments, the key manager may be an external key manager. An external key manager may be an external hardware component, a software component executed on an external computing device, and/or a software component under the control of a third-party. In some embodiments, the external key manager may be a third-party system associated with a storage environment that securely manages authentication keys used by disks in the storage system.

In some embodiments, the key manager may control visibility of plaintext to certain agents and users by controlling access to re-encryption keys. In other words, the key manager may make available keys to translate from a user key (e.g., a first key) or to a master key (e.g., a second key), but may not make the master key itself available.

In some embodiments, various cryptographic protocols may be used. For example, in some embodiments, a public-key system may be used. In a public-key system, two separate keys may be used (e.g., a private key and a public key), one of which is publically available and one of which may be secret. Although these keys may be different, these keys may be mathematically linked and complimentary with respect to each other. For example, a public key of an intended recipient may be used to encrypt data that may then be provided to the recipient in an encrypted form. Since this data was encrypted using the public key, the only way to decrypt the data is using the related private key (which is held in secret by the recipient). Accordingly, only the recipient may decrypt the encrypted data. Therefore and if an encryption key is an asymmetric public encryption key of a private/public key pair, the only way that encrypted data may be decrypted is through the use of an asymmetric private encryption key.

Additionally and in some key systems, the key may not be computed in a reasonable amount of time. However and in other key systems, the relationship may be asymmetric and the public key may be computed in a reasonable amount of time from the private key. For this disclosure and without loss of generality, the "private key" is intended to be interpreted as the key that may not be computed from the other in a reasonable amount of time. If both of the keys in a private/public key pair system have this property, then either of the keys may be designated as the "private key" and the other key may be designated the "public key".

Figure 5:
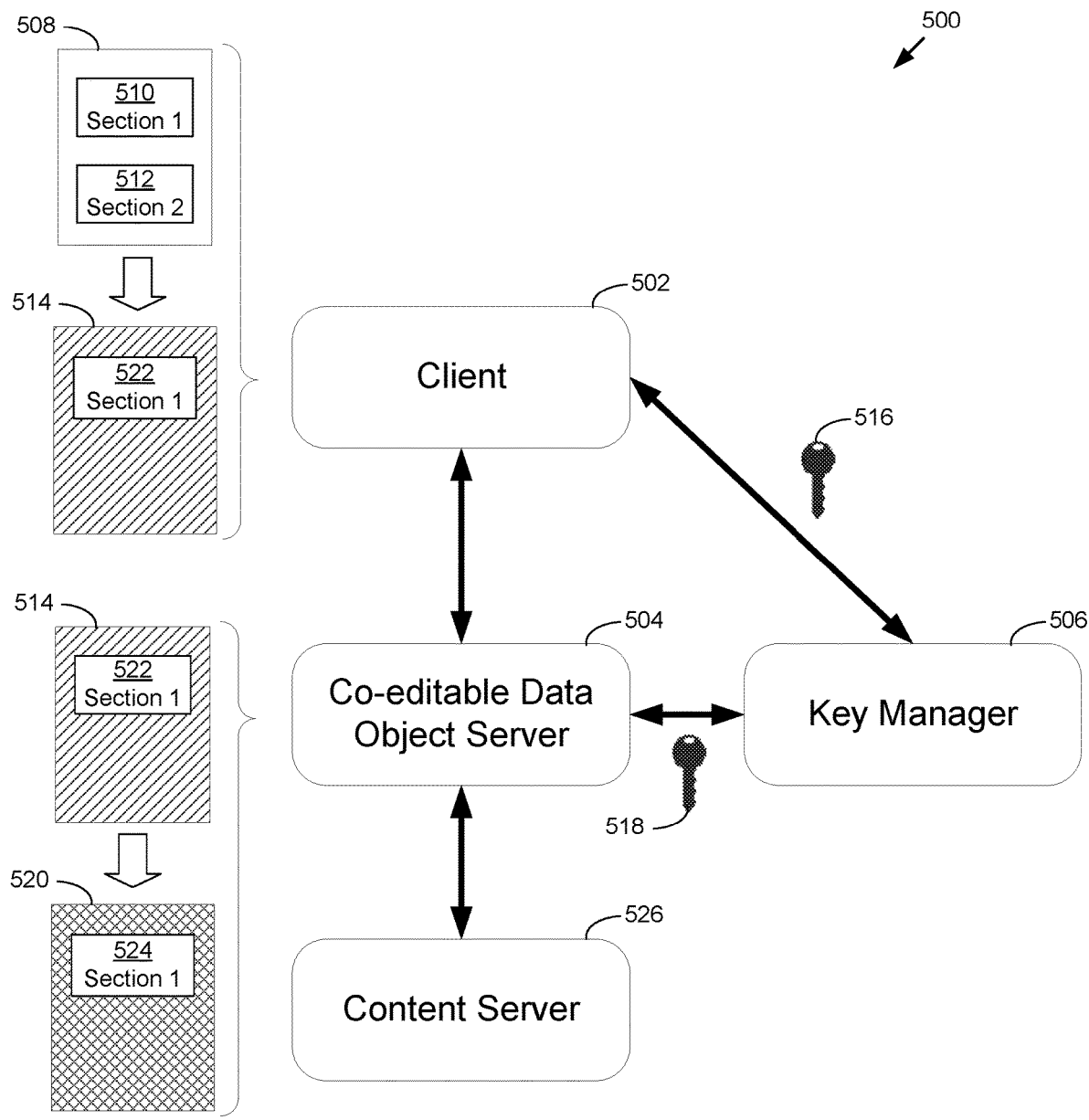
FIG. 5 diagrammatically depicts an implementation of the co-editing process of FIG. 1, according to an example embodiment.

Referring also to FIG. 5, the co-editable data object may be stored on a client. In some embodiments, client 502 may interact and/or be configured to interact with co-editable data object server 504 and/or key manager 506. Additionally and/or alternatively, co-editable data object server 504 may interact and/or be configured to interact with client 502 and key manager 506. In one example, client 502 (e.g., computing device 54B operated by user 36) may have a co-editable data object 508 with one or more content sections or portions (e.g., section 1 510 and section 2 512). User 36 may wish to collaborate with user 40 and user 42 to alter co-editable data object 508. As will be discussed in greater detail below, co-editing process 96 may provide a first encrypted version of the co-editable data object 514 from client 502. In some embodiments and as will be discussed in greater detail below, co-editable data object 508 and/or a version of co-editable data object 508 may be encrypted with a first key 516. Co-editing process 96 may receive the first encrypted version of the co-editable data object 514 from client 502 at the co-editable data object server 504. As will be discussed in greater detail below, co-editing process 96 may request the second key 518 for re-encrypting the first encrypted version of the co-editable data object 514 and re-encrypt the first encrypted version of the co-editable data object 514 to generate a second encrypted version of the co-editable data object 520 using the second key 518. In some embodiments and as will be discussed in greater detail below, co-editing process 96 may provide the second encrypted version of the co-editable data object 520 to one or more clients.

Continuing with the above example, and will be discussed in greater detail below, co-editing process 96 may receive 402, at the co-editable data object server 504, a first encrypted change set 522 for co-editable data object 508 from client 502, the first encrypted change set 514 may be encrypted by a first key 516. User 36 in collaboration with user 40 and/or user 42 may collaboratively edit co-editable data object 508. In this example, user 36 may make a change to co-editable data object 508, specifically, for example, to section 1 510. As will be discussed in greater detail below, the change to co-editable data object 508 may be considered as a "change set." A change set as used herein may include but is not limited to a delta or set of changes that may identify changes to a co-editable data object and/or a version of the co-editable data object. In some embodiments, a change set may be used to communicate the changes to a co-editable data object without communicating the entire co-editable data object.

Returning to the above example, user 36's change to section 1 510, for example, may be referred to as change set 510. In some embodiments, co-editing process 96 may request a first key 516 for encrypting change 510. In some embodiments, client 502 may request and receive a first key 516 for encrypting change set 510 from key manager 506. In some embodiments, encrypting change set 510 with the first key 516 may generate the first encrypted change set 522. First key 516 may be a per client per file key. For example, client 502 may receive first key 516 for encrypting change set 510. First key 516 may be specific to client 502 and/or user 36 and/or for changes made to co-editable data object 508 during the collaboration session. First key 516 may be a symmetric or an asymmetric key. In some embodiments, client 502 and/or key manager 506 may have access to first key 516 for encrypting and/or decrypting first encrypted change set 514. In other words, first encrypted change set 522 may be protected from unauthorized access beyond client 502 and/or key manager 506. Co-editing process 96 may provide the first encrypted change set 522 from client 502 to co-editable data object server 504.

In some embodiments, co-editing process 96 may request 404 a second key 518 for re-encrypting the first encrypted change set 522. In some embodiments, second key 518 may remain unknown to co-editable data object server 504. In other words, co-editing process 96 may include a proxy re-encryption scheme to generate a second encrypted change set 524 using second key 518 which is not known to co-editable data object server 504. In some embodiments, co-editable data object server 504 with second key 518 may be unable to read or access the contents of first encrypted change set 522. In some embodiments, second key 518 may be specific to co-editable data object 508. For example, second key 518 may be specific and/or exclusive to co-editable data object 508. Returning to the above example, user 36's change to co-editable data object 508, encrypted as first encrypted change set 522, may be re-encrypted with second key 518 which may be specific to co-editable data object 508. In some embodiments, co-editing process 96 may request the second key 518 from key manager 506. As discussed above and in some embodiments, key manager 506 may be an external key manager. In embodiments including requesting the second key 518 from key manager 506, co-editing process 96 may, for example, utilize a public/private key system where the first encrypted co-editable data object may encrypted with a public key but may only be decrypted with a private key specific to co-editable data object 508 and may not be visible outside key manager 506. However, other key systems are within the scope of the present disclosure. In some embodiments, co-editing process 96 may periodically "re-key" one or more clients and/or coordinate new keys with the key manager. In some embodiments, re-keying may be handled at each client.

In some embodiments, co-editing process 96 may re-encrypt 406 the first encrypted change set to generate a second encrypted change set using the second key. Returning to the above example, user 36's change to co-editable data object 508 may be re-encrypted using second key 518 to generate second encrypted change set 524. In some embodiments, the re-encryption of first encrypted change set 522 may occur after co-editable data object server receives first encrypted change set 522. In some embodiments, co-editing process 96 may cache second key 518 for the duration of the collaborative editing session within co-editable data object server 504. In some embodiments, co-editable data object server 504 may store second encrypted change set 524 on content server 526 and/or in or across cloud computing nodes 10.

In some embodiments, first encrypted change sets 522 and/or second encrypted change set 522 may be unreadable by co-editable data object server 504. In some embodiments and as discussed above, co-editable data object server 504 may be operated by a service provider within a cloud computing environment. In some embodiments, the service provider may be able to access co-editable data objects. However, embodiments utilizing co-editing process 96 may render content unreadable by the service provider. For example and as discussed above, first encrypted change set 522 may be encrypted with first key 516. In some embodiments, first key 516 may be specific to client 502. Therefore, only a client and/or user with access to first key 516 may be able to access the contents of first encrypted change set 522. In some embodiments, first encrypted change set 522 may be provided to and/or received at co-editable data object server 504 for distributing to a plurality of users at one or more clients. Instead of sharing first key 516 with other clients and/or users of co-editing process 96 or providing first key 516 to co-editable data object server 504, co-editing process 96 may include re-encrypting 404 first encrypted data object 522 with second key 518 to generate second encrypted data object 524. As discussed above, co-editable data object server 504 may not have access to and/or have first key 516 and/or second key 518. Therefore, without first key 516 and second key 518, co-editable data object server 504 and/or service provider of co-editable data object server 504 may be unable to decrypt second encrypted change set 524 to access the contents of co-editable data object 508 and/or change set 510.

Figure 6:
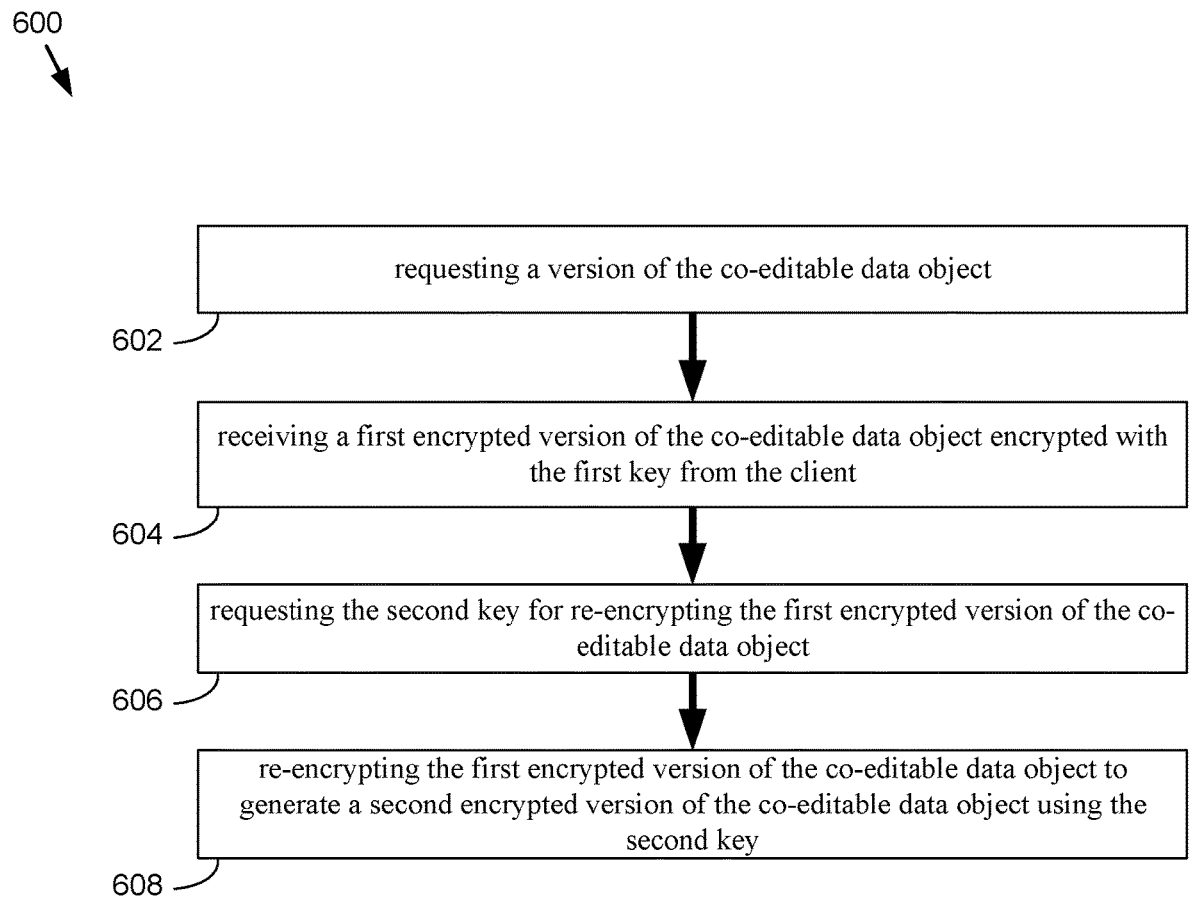
FIG. 6 diagrammatically depicts an implementation of the co-editing process of FIG. 1, according to an example embodiment.

Referring also to FIG. 6, co-editing process 96 may request 602 a version of the co-editable data object. In some embodiments, co-editing process 96 may periodically request a version from one or more clients. In one example, co-editing process 96 may request a version of the co-editable data object to begin a collaboration session. In some embodiments and as will be discussed in greater detail below, the requested version of the co-editable data object may be provided to and/or requested from one or more clients within the collaboration session and may be the focus for the collaboration session. In some embodiments, and as will be discussed in greater detail below, co-editing process 96 may determine that a new version of the co-editable data object may be necessary or desirable. In some embodiments, the new version the co-editable data object may include a version of the co-editable data object incorporating one or more changes (e.g., second encrypted change set 524) made previously to co-editable data object 508.

In some embodiments, co-editing process 96 may provide a first encrypted version of the co-editable data object 514 to co-editable data object server 504 from client 502. In some embodiments, co-editable data object 508 and/or a version of co-editable data object 508 may be encrypted with a first key 516. In some embodiments, co-editing process 96 may receive 604 a first encrypted version of the co-editable data object 514 encrypted with the first key 516 from the client 502. In some embodiments, co-editing process 96 may request 606 the second key 518 for re-encrypting 606 the first encrypted version of the co-editable data object 514. As discussed above relative to requesting 404 a second key 518 for re-encrypting the first encrypted change set 520, co-editing process 96 may request second key 518 from key manager 506. In some embodiments, co-editing process 96 may re-encrypt 608 the first encrypted version of the co-editable data object 514 to generate a second encrypted version of the co-editable data object 520 using the second key 518. In some embodiments, co-editable data object server 504 may store second encrypted version of the co-editable data object 520 on content server 526 and/or in or across cloud computing nodes 10.

Figure 7:
FIG. 7 diagrammatically depicts an implementation of the co-editing process of FIG. 1, according to an example embodiment.

Referring also to FIG. 7, co-editing process 96 may receive 702 a request from the client for one or more of the second encrypted change set and the second encrypted version of the co-editable data object. While FIG. 5 may show that first encrypted version of the co-editable data object 514 includes first encrypted change set 522 and that second encrypted version of the co-editable data object 520 includes second encrypted change set 524, these are for example purposes only. For example, co-editing process 96 may include receiving first encrypted version of the co-editable data object 514 or first encrypted change set 522. In other words, co-editing process 96 is not limited to or required to receive first encrypted version of the co-editable data object 514 and first encrypted change set 522. Similarly, co-editing process 96 is not limited to or required to provide second encrypted version of the co-editable data object 520 and second encrypted change set 524. In some embodiments, co-editing process 96 may receive a request from client 502 to provide or fetch one or more of second encrypted version of the co-editable data object 520 and second encrypted change set 524. In some embodiments, co-editing process 96 may determine that client 502 has not received change set 510 and client 502 may request any outstanding change sets. In some embodiments, client 502 and/or co-editing process 96 may determine that client 502 has an outdated version of the co-editable data object. In some embodiments, client 502 may join the plurality of clients collaboratively editing co-editable data object 508 and may not have a version or a current version of co-editable data object 508. For these and other reasons, client 502 may request second encrypted version of co-editable data object 520 and/or second encrypted change set 524 and/or co-editing process 96 may receive a request from client 502 for second encrypted version of the co-editable data object 520 and/or second encrypted change set 524.

In some embodiments, co-editing process 96 may provide 704 one or more of the second encrypted change set and the second encrypted version of the co-editable data object to the client. In some embodiments, co-editing process 96 may provide one or more of the second encrypted change set 524 and the second encrypted version of the co-editable data object 520 to client 502 in response to a request received from client 502. In some embodiments and as discussed above, co-editing process 96 may provide one or more of second encrypted change set 524 and the second encrypted version of the co-editable data object 520 to client 502 without receiving a request from client 502.

Figure 8:
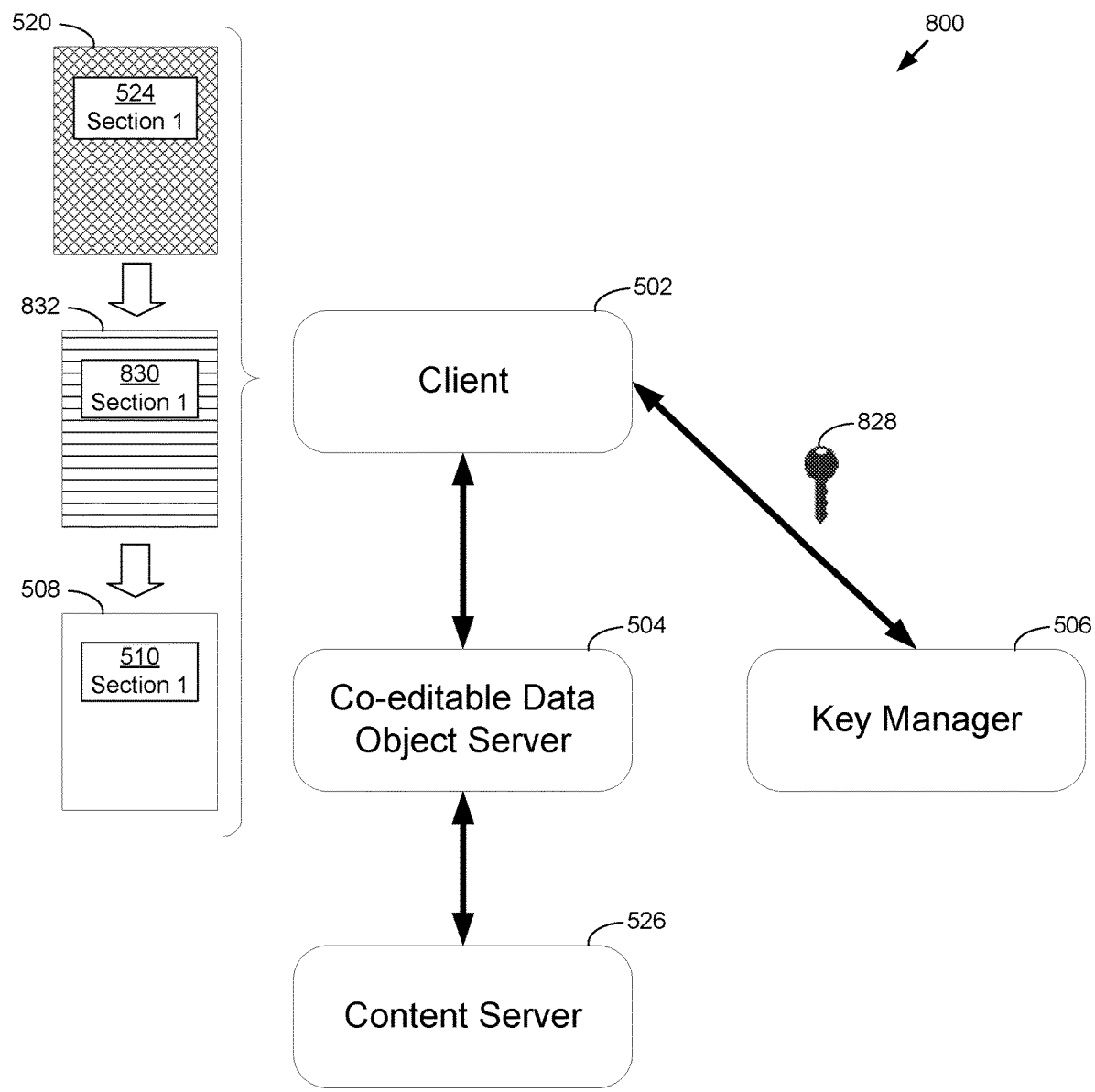
FIG. 8 diagrammatically depicts an implementation of the co-editing process of FIG. 1, according to an example embodiment.

Referring also to FIG. 8, client 502 may request one or more of second encrypted change set 524 and second encrypted version of the co-editable data object 520. Returning to the above example, assume for example purposes that co-editing process 96 received a request from client 502 for second encrypted change set 524. In some embodiments, second encrypted change set 524 may be stored in co-editable data object server 504 or in content server 526. When second encrypted change set 524 is stored in content 526, co-editing process 96 may request and receive second encrypted change set 524 from content server 526. Co-editing process 96 may provide second encrypted change set 524 to client 502. Client 502 may request a third key 828 from key manager 506 to re-encrypt second encrypted change set 524 to generate a third encrypted change set 830.

Additionally and/or alternatively, client 502 may request second encrypted version of co-editable data object 520. Co-editing process 96 may provide second encrypted version of co-editable data object 520 to client 502. Client 502 may request third key 828 from key manager 506 to re-encrypt second encrypted version 520 to generate third encrypted version of co-editable data object 832.

In some embodiments, third key 828 may be specific to client 502. For example, client 502 may request and receive third key 828 from key manager 506. In some embodiments, third encrypted version of co-editable data object 832 may be accessible and/or decrypted by client 502 using a key known by client 502. As discussed above, second encrypted version of the co-editable data object and second encrypted change set 524 may each be encrypted using the second key unknown to co-editable data object server 504 and/or client 502. The second encryption of each of the version of co-editable data object and change set allow additional levels of protection. For example, imagine someone somehow obtained second key 518. While second key 518 may be used to decrypt or otherwise access first encrypted change set 522 and/or first encrypted version of the co-editable data object 514, the contents of/within first encrypted change set 522 and/or first encrypted version of the co-editable data object 514 would be accessible only if first key 516 was also somehow obtained. Additionally and/or alternatively, imagine someone somehow obtained first key 516. While first key 516 may be used to decrypt or otherwise access first encrypted change set 522 and/or first encrypted version of the co-editable data object 514, the contents of/within second encrypted change set 524 and/or second encrypted version of the co-editable data object 520 would be accessible only if second key 518 was also somehow obtained.

As described above, co-editing process 96 may allow client 502 to obtain access to/decrypt second encrypted change set 524 and/or second encrypted version of co-editable data object 520 without compromising or revealing second key 518. Co-editing process 96 may re-encrypt second encrypted change set 524 and/or second encrypted version of co-editable data object 520 using third key 828 to generate third encrypted change set 830 and/or third encrypted version of co-editable data object 832. Each of third encrypted change set 830 and/or third encrypted version of co-editable data object 832 may be decrypted by client 502 using a key known to client 502 that client 502 can access.

In some embodiments, co-editing process 96 may prevent unintentional or unwarranted access to the contents of a change set or version of the co-editable data object by re-encrypting second encrypted change set 524 and/or second encrypted version of co-editable data object 520 using third key 828 known to authorized clients, e.g., client 502.

In some embodiments, client 502 may obtain access to/decrypt second encrypted change set 524 and/or second encrypted version of co-editable data object 520 and incorporate the second encrypted change set 524 into client's 502 version of the co-editable data object. In some embodiments, co-editing process 96 may allow client 502 to make changes to a co-editable data object and provide those changes to the co-editable data object server to be shared with and/or provided to other clients of a collaborative session. As discussed above and in some embodiments, co-editable data object server 504 may receive, re-encrypt, and/or provide the changes to the co-editable data object without obtaining access to and/or decrypting the plaintext of the co-editable data object and/or the encrypted changes from client 502. In some embodiments, client 502 may obtain access to/decrypt a second encrypted change set and/or second encrypted version of co-editable data object 520 to integrate changes to the co-editable data object and/or to replace a version of the co-editable data object.

Figure 9:
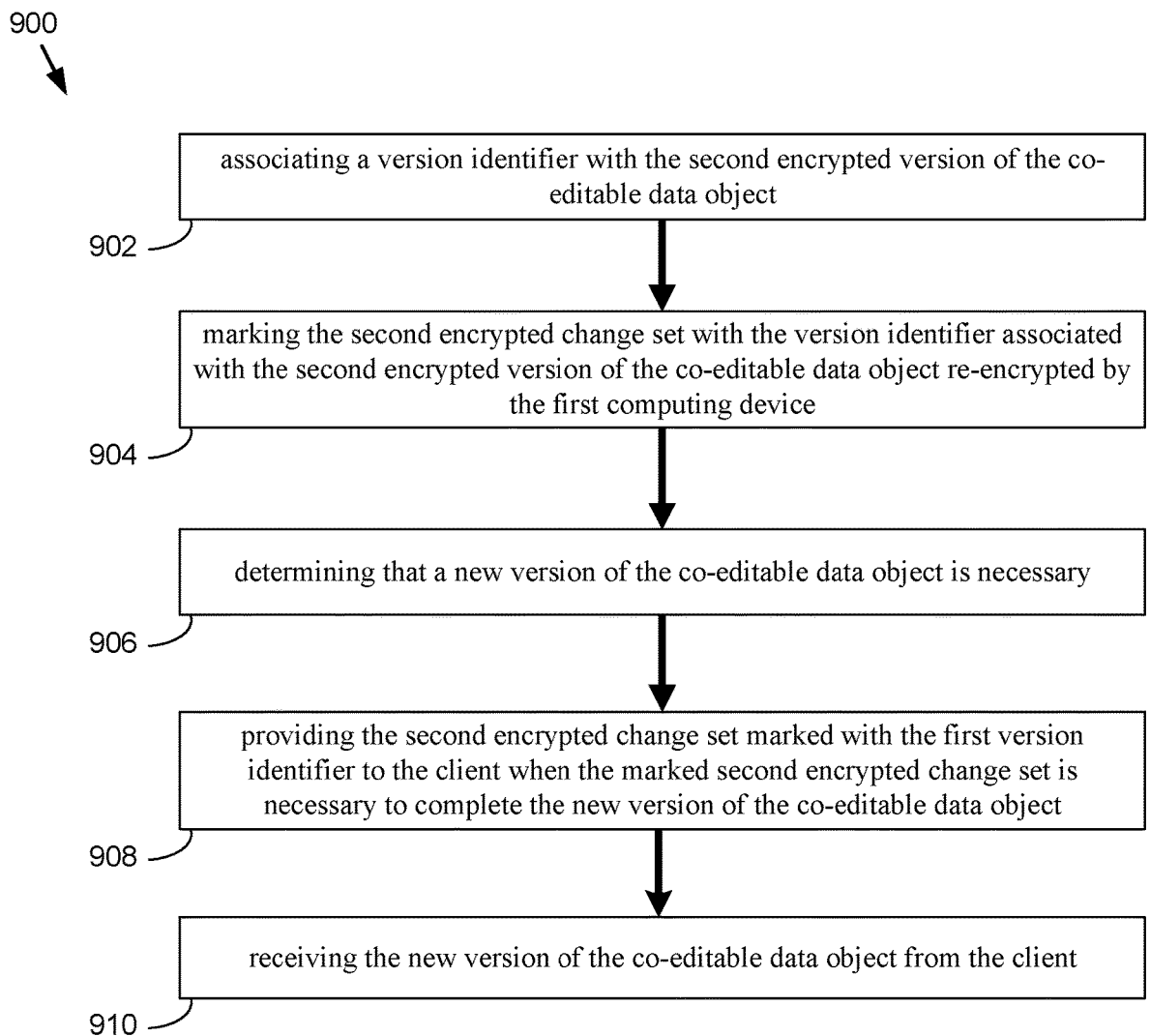
FIG. 9 diagrammatically depicts an implementation of the co-editing process of FIG. 1, according to an example embodiment.
Figure 10:
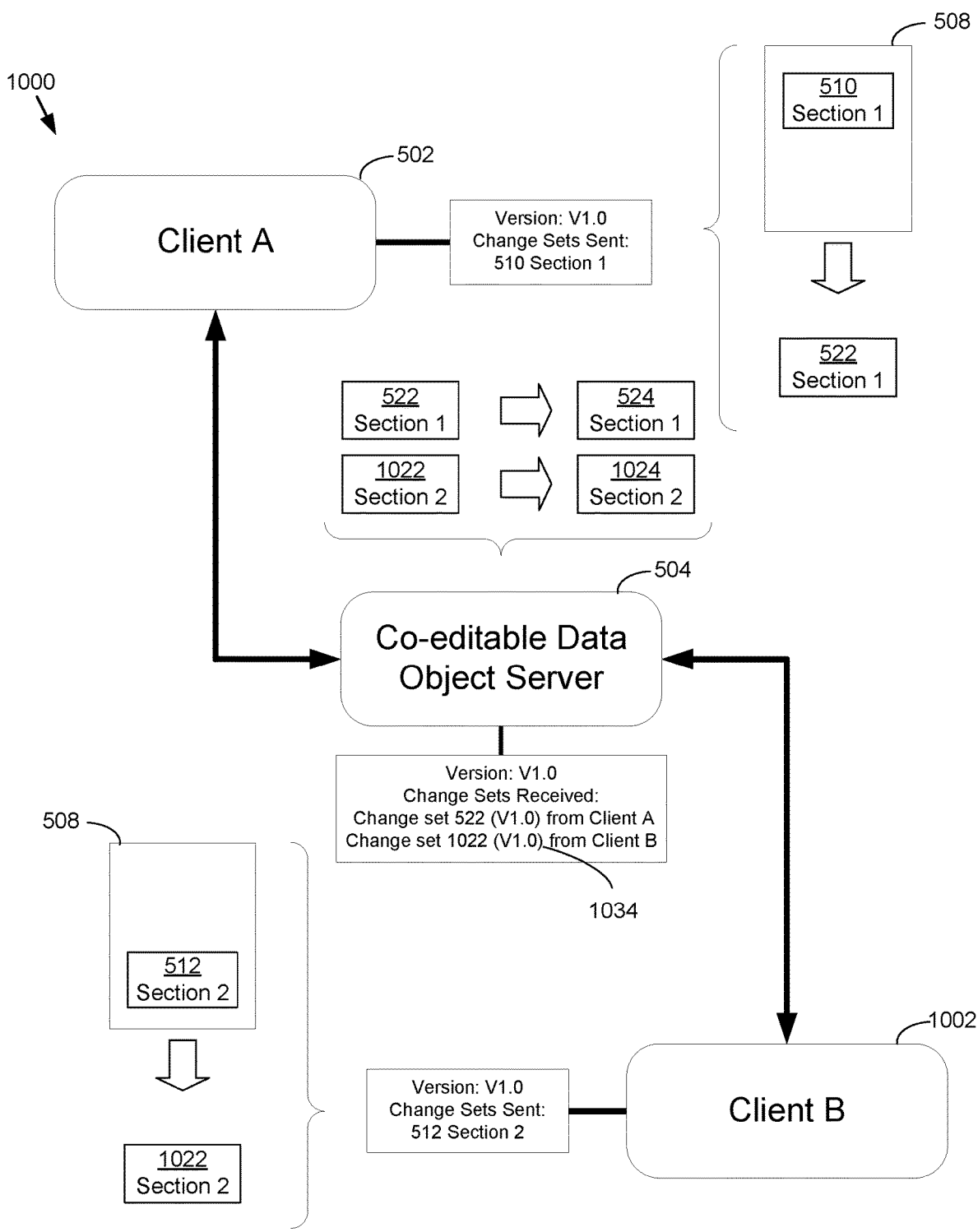
FIG. 10 diagrammatically depicts an implementation of the co-editing process of FIG. 1, according to an example embodiment.

Referring also to FIGS. 9 and 10, co-editing process 96 may associate 902 a version identifier with the second encrypted version of the co-editable data object. Returning to the above example, user 36 (via client A 502) may make a change to section 1 510 of co-editable data object 508 and user 40 (via client B 1002) may make a change to section 2 512 of co-editable data object 508. In some embodiments, co-editing process 96 may encrypt change set 510 and change set 512 to generate first encrypted change set 522 and first encrypted change set 1022, respectively. client A 502 and client B 1002 may provide first encrypted change set 522 and first encrypted change set 1022, respectively, to co-editable data object server 504. In other words, co-editing process 96 may receive first encrypted change set 522 and first encrypted change set 1022 from client A 502 and client B 1002, respectively. In some embodiments, co-editing process 96 may request a second key 518 for re-encrypting each of first encrypted change set 522 and first encrypted change set 1022. In some embodiments, co-editing process 96 may receive a second key 518 for each of first encrypted change set 522 and first encrypted change set 1022 from key manager 506. In some embodiments, co-editing process 96 may re-encrypt second encrypted change set 522 and first encrypted change set 1022 using second key(s) 518 to generate second encrypted change set 524 and second encrypted change set 1024, respectively. It will be appreciated that the second key used to encrypt first encrypted change set 522 and used to encrypt first encrypted change set 1022 may include the same key and/or may include different keys.

In some embodiments, co-editing process 96 may mark 904 the second encrypted change set with the version identifier associated with the second encrypted version of the co-editable data object re-encrypted by the first computing device. The version identifier may allow change sets to be incorporated into the co-editable data object (e.g., the master, original, or current version of the co-editable data object stored at client 502), such that the various changes included within the change sets may be incorporated in the correct location within the co-editable data object. In some embodiments, co-editing process 96 may collect a single version from one or more clients at a point of established consistency (i.e., consistency among the multiple single versions). In some embodiments, the single version collected from one or more clients may be the most recent version. In some embodiments, the version collected may be a milliseconds older than the most recent version in order to establish consistency. Returning to the above example and in some embodiments, co-editing process 96 may mark 904 second encrypted change set 524 and second encrypted change set 1024 with a version identifier. In the example of FIG. 10, clients A and B may both be working from version "V1.0". Co-editing process 96 may mark second encrypted change set 524 and second encrypted change set 1024 with the version identifier "V1.0" 1034. While "V1.0" has been described as an exemplary version identifier, other version identifiers are within the scope of the present disclosure.

Figure 11:
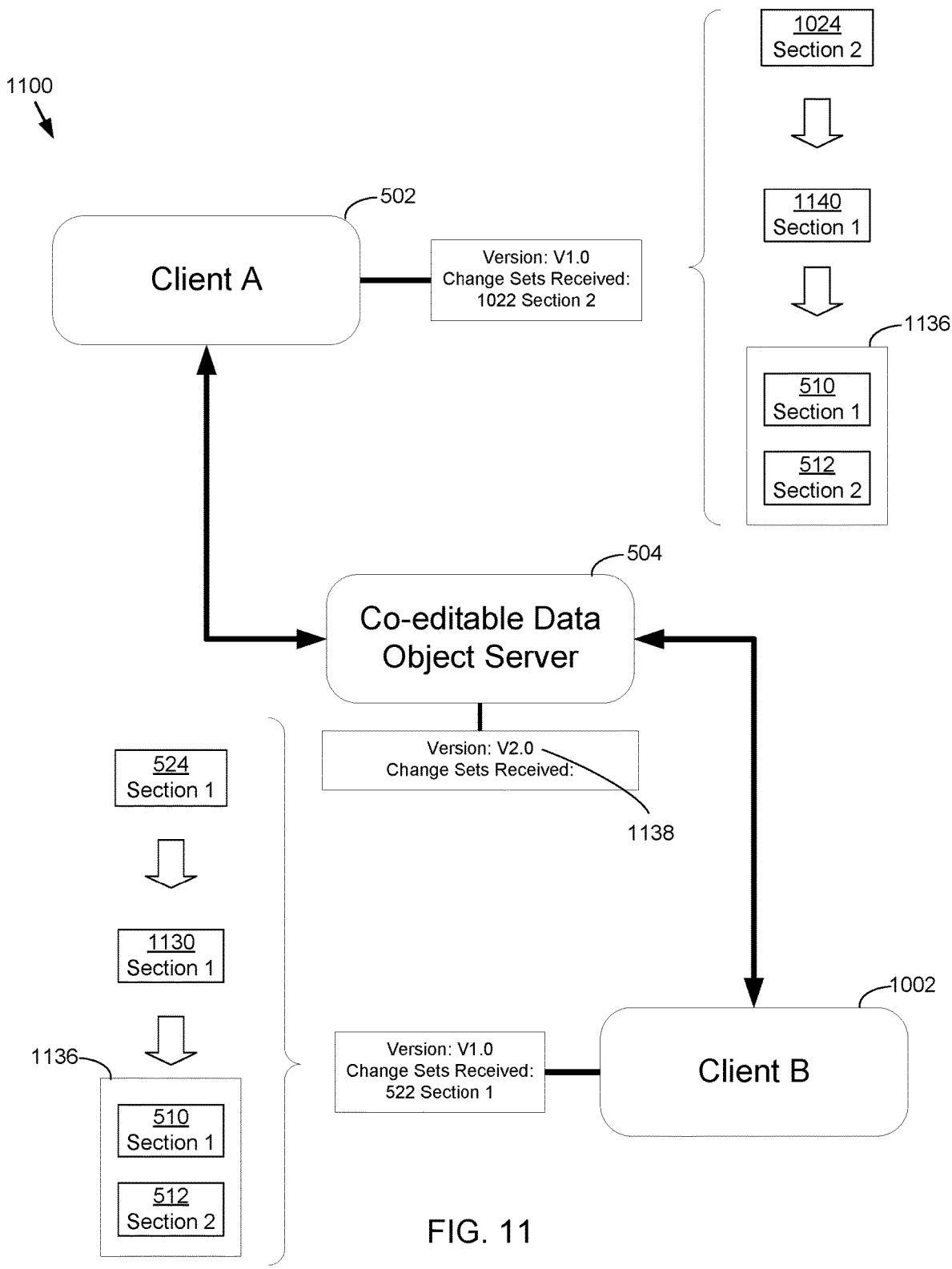
FIG. 11 diagrammatically depicts an implementation of the co-editing process of FIG. 1, according to an example embodiment.

Referring also to FIGS. 7 and 11 and as discussed above, co-editing process 96 may provide 704 one or more of second encrypted change set 1024 and second encrypted change set 524 to client A 502 and client B 1002, respectively. As discussed above, this may be in response to a request received from one or more of client A 502 and client B 1002 and/or may not be in response to a request received.

In some embodiments, co-editing process 96 may determine 706 that a new version of the co-editable data object is necessary or desirable. In one example, client A 502 and client B 1002 may make several changes to co-editable data object 508. These changes may include minor revisions or substantial changes to co-editable data object 508. Suppose that client A, operated by user 36, deletes a paragraph and client B, operated by user 40, adds several lines to that paragraph. After each of the changes are reflected to client A and client B, the new lines added by client B may be confusing or may be without context as client A deleted the paragraph before the new lines. In another example, an accumulation of change sets and/or time required to encrypt, re-encrypt, and/or decrypt the accumulated change sets may cause undesirable delay during collaboration. Suppose client A makes substantial changes such as deleting several slides of a co-editable presentation, instead of communicating the deletion of the several slides, providing a new version of the co-editable presentation may reduce the amount of data and/or time required to provide the changes made to the co-editable presentation. For these and other reasons, co-editing process 96 may determine that a new version of the co-editable data object 1136 is necessary or desirable to maintain the consistency between the clients of a collaboration session.

In some embodiments, co-editing process 96 may determine that a new version of the co-editable data object 1136 is necessary or desirable based upon, at least in part, determining when one or more change sets exceed a threshold number of deletions of content within the co-editable data object. In some embodiments, co-editing process 96 may determine that a threshold number of deletions of content has been exceeded and instead of providing the one or more second encrypted change sets, co-editing process 96 may determine that a new version is needed. In some embodiments, co-editing process 96 may determine that a new version is needed or desirable based upon, at least in part, determining the time required by the one or more clients to decrypt and/or reassemble the co-editable data object with one or more change sets. In some embodiments, determining the time required by the one or more clients to decrypt and/or reassemble the co-editable data object with the one or more change sets may include determining the CPU capacity of the one or more clients and determining whether the time required for the CPU to process the one or more change sets (e.g., decrypting and reassembling) exceeds a predetermined time threshold. These examples provided above are not exhaustive and, in some embodiments, determining that a new version is necessary or desirable may be based on other factors within the scope of the present disclosure.

In some embodiments, co-editing process 96 may determine that a new version of the co-editable data object 1136 is necessary or desirable based upon, at least in part, determining that a connection quality between co-editable data object server 504 and client 502 meets a predetermined threshold, determining an initial client of a plurality of clients and receiving a version from the initial client; determining that a user is closing the co-editing data object/collaborative editing session, and/or when manually triggered by a user. In some embodiments when co-editing process 96 determines that a new version is necessary or desirable, co-editing process 96 may increment or otherwise revise the version identifier 1034 to generate a new version identifier 1138.

In some embodiments, co-editing process 96 may provide 708 the second encrypted change set marked with the first version identifier to the client when the marked second encrypted change set is necessary or desirable to complete the new version of the co-editable data object. Referring again to the example of FIG. 11, co-editing process 96 may determine that a new version of the co-editable data object 1136 is necessary or desirable. In some embodiments, co-editing process 96 may choose "V1.0" as the version upon which the new version and subsequent change sets may be based. For example and as discussed above, first encrypted change set 1022 may be received from client B 1002 and may be re-encrypted to generate second encrypted change set 1024. Second encrypted change set 1024 may be marked with version identifier 1034 "V1.0". Additionally and as discussed above, first encrypted change set 522 may be received from client A 502 and may be re-encrypted to generate second encrypted change set 524. Second encrypted change set 524 may be marked with version identifier 1034 "V1.0". In some embodiments, co-editing process 96 may determine that client 502 may desire second encrypted change set 1024 to complete new version of the co-editable data object 1136. Additionally and in some embodiments, co-editing process 96 may determine that client 1002 may desire second encrypted change set 524 to complete new version of the co-editable data object 1136. In some embodiments, co-editing process 96 may provide second encrypted change set 1024 to client A 502 and/or may provide second encrypted change set 524 to client B 1002.

In some embodiments, client A 502 may receive second encrypted change set 1024 and, as described above, request a third key 828 to re-encrypt second encrypted change set 1024 to generate third encrypted change set 1140. Using a key known to client 502, third encrypted change set 1140 may be decrypted to obtain change set 512. In some embodiments, new version of co-editable data object 1136 may be assembled and/or configured at client 502 to include at least change set 510 and change set 512. Additionally and/or alternatively, client B 1002 may receive second encrypted change set 524 and, as described above, request a third key 828 to re-encrypt second encrypted change set 524 to generate third encrypted change set 1130. Using a key known to client 1002, third encrypted change set 1130 may be decrypted to obtain change set 510. In some embodiments, new version of co-editable data object 1136 may be assembled and/or configured at client 1002 to include at least change set 510 and change set 512.

Figure 12:
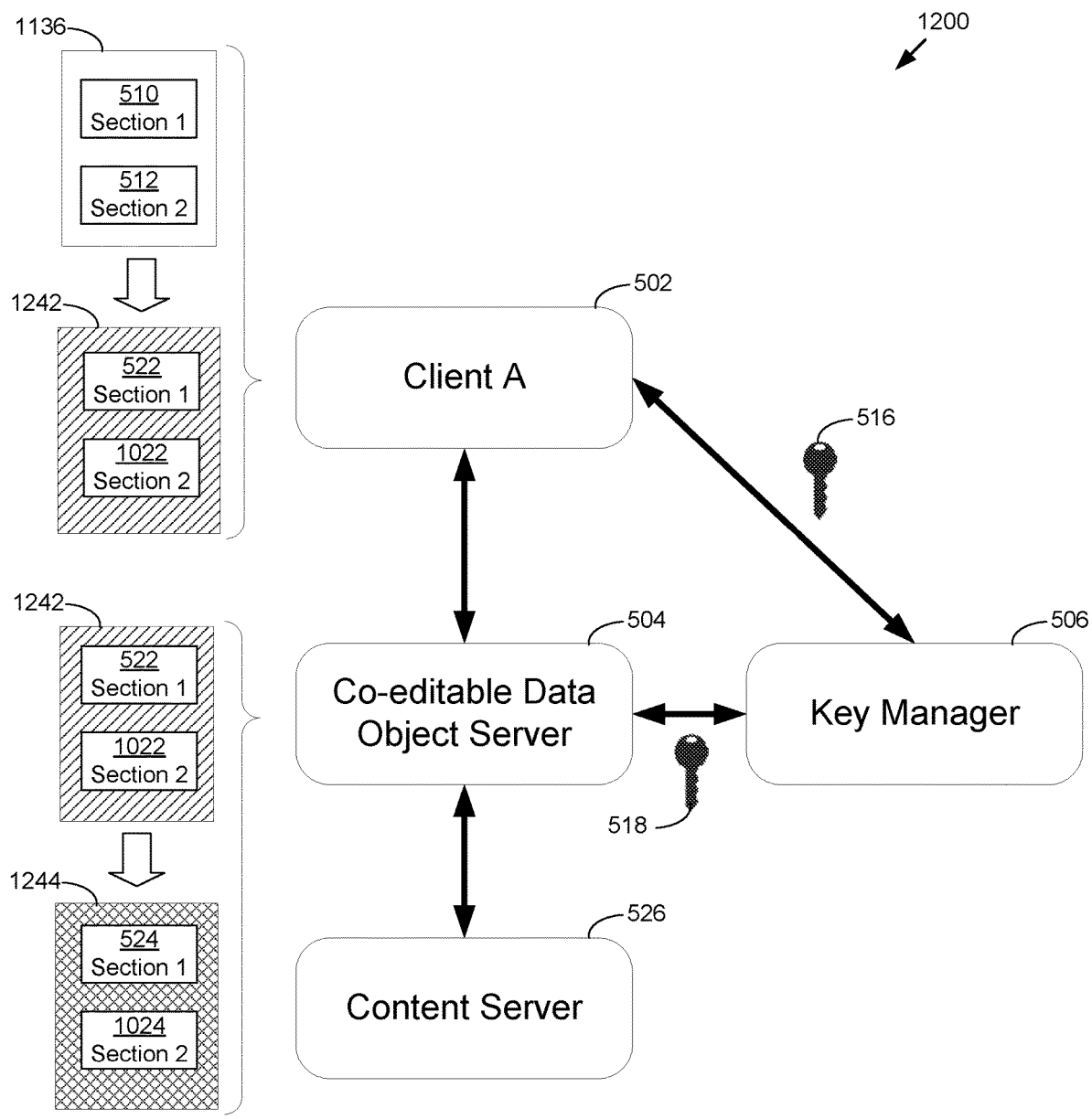
FIG. 12 diagrammatically depicts an implementation of the co-editing process of FIG. 1, according to an example embodiment.

Referring also to FIG. 12 and in some embodiments, co-editing process 96 may receive 710 the new version of the co-editable data object from the client. In some embodiments, co-editing process 96 may determine that client 502 has all the change sets necessary for new version of the co-editable data object 1136. In some embodiments and as discussed above, co-editing process 96 may request first key 516 to encrypt new version of the editable data object 1136 to generate first encrypted version of co-editable data object 1242. In some embodiments, client 502 may provide at least a portion of first encrypted new version of the co-editable data object 1242 to co-editable data object server 504. In some embodiments, co-editing process 96 may receive at least a portion (e.g., a section or bytes of a total version of co-editable data object) of first encrypted new version of the co-editable data object 1242 at co-editable data object server 504. In some embodiments, and as discussed above first encrypted version of co-editable data object 1242 may include first encrypted change set 522 and/or first encrypted change set 1022. While first encrypted change set 522 and/or first encrypted change set 1022 are shown to be individually encrypted, change sets incorporated into new version of co-editable data object 1136 may be encrypted within first encrypted new version of the co-editable data object 1242. However, change sets 510 and 512 may be shown in FIG. 12 as first encrypted change sets 522 and 524 to show that new version of the co-editable data object 1136 may include these change sets. Returning to the above example and in some embodiments, co-editing process 96 may request second key 518 to re-encrypt first encrypted new version of the co-editable data object 1242 to generate second encrypted new version of the co-editable data object 1244.

Figure 13:
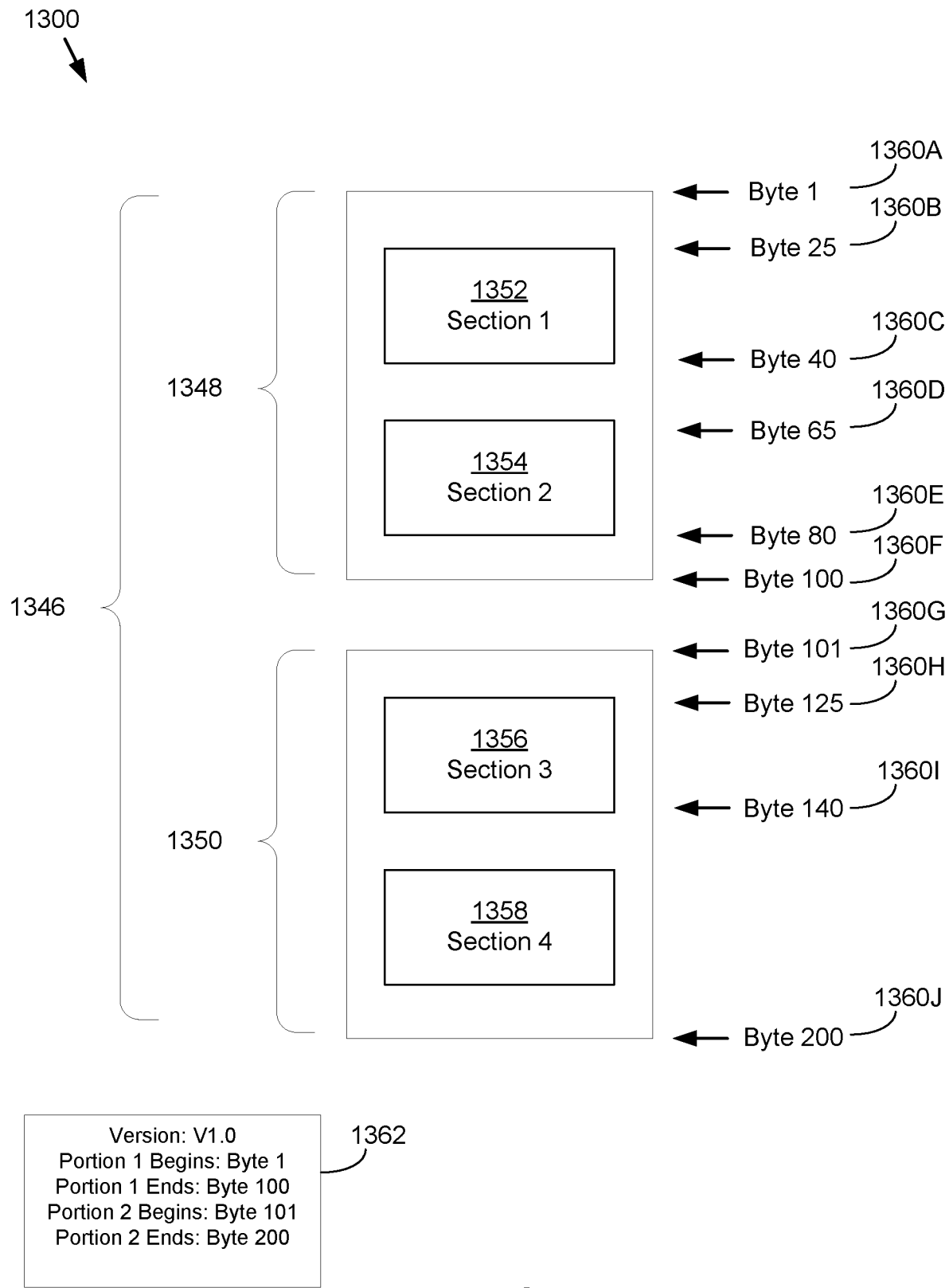
FIG. 13 diagrammatically depicts an implementation of the co-editing process of FIG. 1, according to an example embodiment.

In some embodiments, the second encrypted change set may be marked with one or more position indicators that may indicate the position of one or more changes within the co-editable data object. Referring also to FIG. 13, co-editable data object 1346 may include one or more portions, portion 1348 and portion 1350. Portion 1348 may include one or more sections, section 1 1352 and section 2 1354. In some embodiments, portion 1350 may include one or more sections, section 3 1356 and section 4 1358. While two portions and four sections have been described, any number of portions and/or sections are within the scope of the present disclosure. In some embodiments, portion 1348 and portion 1350 of co-editable data object 1346 may have one or more position indicators 1360A-1360J that may indicate the position of the portion 1348 within co-editable data object 1346. In one example, section 1 1352 of portion 1348 may have its position indicated within co-editable data object 1346 with position indicator "Byte 25" 1360B and position indicator "Byte 40" 1360C.

In some embodiments, and referring again to FIG. 5, co-editing process 96 determine the position of second encrypted change set 524 within a co-editable data object based upon, at least in part, the one or more position indicators 1360A-1360J. For example, and referring also to FIG. 13, a change to section 1 1350 of co-editable data object 1342 may be identified as a change between byte 25 and byte 40 of the co-editable data object.

In some embodiments, co-editing process 96 may receive a first encrypted index listing encrypted with the first key from the client, the first encrypted index listing defining one or more boundaries for the one or more position indicators within the co-editable data object. In some embodiments, one or more position indicators 1360A-1360J may be included in an index listing 1362. In some embodiments, an index listing 1362 may define one or more boundaries of portions of co-editable data object 1346. Co-editing process 96 may prepare and/or modify the index listing 1362 at client 502. As discussed above, co-editing process 96 may request a first key 516 for encrypting index listing 1362 to generate first encrypted index listing. In some embodiments, co-editing process 96 may receive first encrypted index listing at co-editable data server 504. In some embodiments, co-editing process 96 may request second key 518 for re-encrypting first encrypted index listing to generate a second encrypted index listing. In some embodiments, co-editing process 96 may re-encrypt the first encrypted index listing to generate a second encrypted index listing using the second key. In some embodiments, second encrypted index listing may be stored in one or more of co-editing data object server 504 and content server 526. As described above, second encrypted index listing may be unreadable or otherwise accessible by co-editable data object server 504.

In some embodiments, co-editing process 96 may provide second encrypted index listing to client 502. In some embodiments, as with second encrypted version of the co-editable data object and/or second encrypted change set, additionally and/or alternatively client 502 may request second encrypted index listing from client 502. In some embodiments, co-editing process 96 may receive a request from client 502 for the second encrypted change set based upon, at least in part, the second encrypted index listing. In one example, client 502 may be provided with second encrypted index listing and, as described above, may be re-encrypted to generate third encrypted index listing which may be accessible and/or decrypted by a key known to client 502. In some embodiments, client 502 may view portion 1348 at a user interface. In one example, co-editable data object 1342 may be a document and user 36 via client 502 may view portion 1348 but may not view portion 1350. In some embodiments, client 502 may request one or more change sets associated with portion 1348 because user 36 may be viewing portion 1348 at a user interface. In some embodiments, co-editing process 96 may receive a request for change sets with a position indicator between position indicators 1360A-1360F. In the above example, co-editable data object server 504 may include a second encrypted change set with a position indicator of "Byte 35". In some embodiments, co-editing process 96 may provide second encrypted change set to client 502 based upon, at least in part, the position indicators associated with second encrypted change set and/or index listing 1362.

In some embodiments, one or more versions of co-editable data object may include a separate index listing for each listing. Co-editing process 96 may provide an updated index listing for each new version of co-editable data object.

In some embodiments, and as described above, an initial value for the position indicator, or index, at the time of change may be computed by the client and sent with the change set. In some embodiments, the co-editable data object server may coordinate multiple changes, and may adjust the position indicators or indexes as other change sets are received. In some embodiments, the position indicators or indexes may define the range of the co-editable data object that may be altered and how many bytes are added and/or removed at the position indicator. For example, user 36 via client 502 may provide a change set with position indicators "Byte 25" 1360B to "Byte 40" 1360C. In this example, the change set may include an addition to co-editable data object 1342. If there were previous change sets noted at position indicator "Byte 60" 1360D and "Byte 80" 1360E, respectively, co-editing process 96 may modify these position indicators of the previous change sets from "Byte 60" 1360D and "Byte 80" 1360E to "Byte 75" and "Byte 95", respectively. In another example, when sending the example change set (e.g., "Byte 25" to "Byte 50"), client 502 may also remove 25 bytes. This may have the net effect of performing an overwrite on the old data (e.g., data between "Byte 25" and "Byte 50"), and so the original indexes for the other two change sets may be unmodified.

In some embodiments, co-editing process 96 may compute the position indicators of each change set from a base position indicator at the time of the change and may apply the position indicators from other subsequent change sets ahead of that in the co-editable data object. In some embodiments, and for some types of co-editable data objects, there may be a two-tiered or hierarchical indexing system compromised of section indexes and byte indexes. For instance, a first change set may be directed to a change in section 4, bytes 170-185, and a second change set may remove section 3 1356, making the real effective index of the first change set section 3, bytes 170-185. For instance, this may be desirable for many types of co-editable data objects such as presentations or word processing documents that may include section breaks. While a two-tiered indexing system has been described, additional tiers are within the scope of the present disclosure.

In some embodiments, other indexing schemes may be used with co-editing process 96. For example, in one embodiment, all changes could be treated as overwrites by default and then co-editing process 96 may explicitly note the number of bytes (or sections) to insert rather than to remove as discussed above. In some embodiments, change sets may also dictate a move, such as, for example, move 5 bytes at position indicator "Byte 25" to position indicator "Byte 50".

In some embodiments, the co-editable data object server may determine the version that a client had and which change sets it had applied when it computed the position indicators. In some embodiments, this version may be a basis co-editable data object. The complete set of changes may be only partially ordered. Additions in this partially ordered system may be handled cumulatively. For example, if two clients provide additions at position indicator "Byte 25" 1360B to the same basis co-editable data object, both additions may be applied in any order (neither client would have a preference). In some embodiments, change sets including removals may consider the removal relative the text of the basis document. In another example, if two clients simultaneously requested the removal of 25 and 30 bytes respectively at the same position indicator or index, the net effect may be the removal of 30 bytes.

Figure 14:
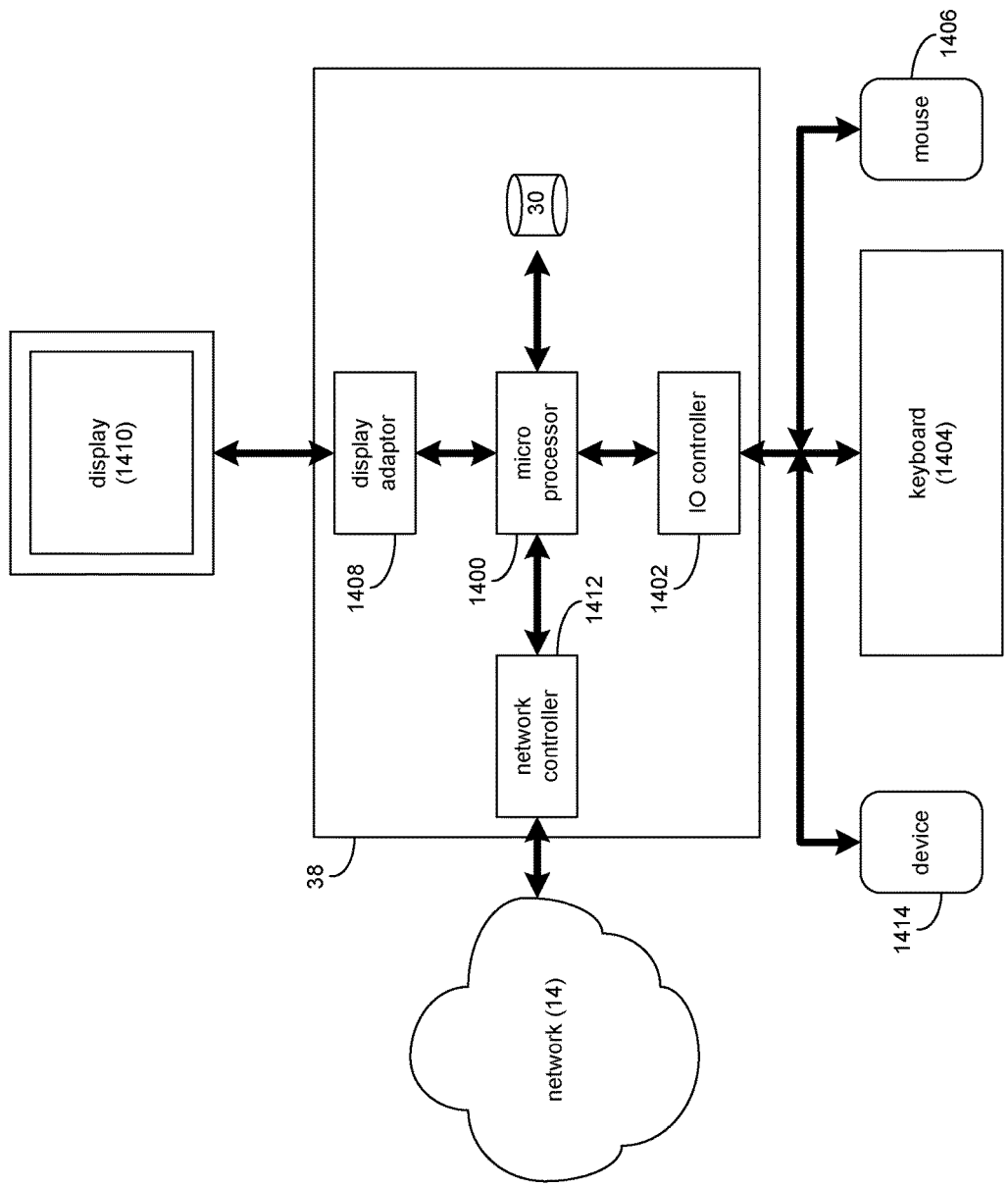
FIG. 14 is a diagrammatic view of the computing device of FIG. 1, according to an implementation of the present disclosure.

Referring also to FIG. 14, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, co-editing process 96 may be substituted for computing device 12 within FIG. 10, examples of which may include but are not limited to client electronic devices 54A-54N.

Computing system 12 may include microprocessor 200 configured to e.g., process data and execute instructions/code for screen capture process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 1402 may be configured to couple microprocessor 1400 with various devices, such as keyboard 1404, mouse 1406, USB ports (not shown), and printer ports (not shown). Display adaptor 1408 may be configured to couple display 1410 (e.g., a CRT or LCD monitor) with microprocessor 1400, while network adapter 1412 (e.g., an Ethernet adapter) may be configured to couple microprocessor 1400 to network 14 (e.g., the Internet or a local area network).

In some embodiments, it may be observed that a service provider who may manage or control co-editable data object server 504 may be unable to access the contents or plaintext of a co-editable data object. For example, and as described above, co-editing process 96 may provide change sets of a co-editable data object that may be accessed by multiple users via multiple clients without providing access to the underlying contents to a service provider or anyone who may gain unauthorized access to either a client or co-editable data object server.

In some embodiments, co-editing process 96 may provide web-based co-editing of a co-editable data object without a cloud service provider gaining access to the plaintext of co-editable data object. In some embodiments of co-editing data 96, datacenter and client breaches may only compromise data already available to be read at the client. In some embodiments, co-editing process 96 may limit exposure of a co-editable data object to sections within the co-editable data object instead of the entire co-editable data object or the plaintext of co-editable data object. In some embodiments, co-editing process 96 may use one or more position indicators (e.g., byte service) to fulfil requests for pages and or sections within an encrypted co-editable data object. In some embodiments, co-editing process 96 may not require the use of a rich client.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving during a collaborative editing session, at a first computing device, a first encrypted change set for a co-editable data object from a client, the first encrypted change set being encrypted by a first key, wherein the collaborative session comprises two or more participants simultaneously accessing the co-editable data object during an electronic meeting or other communication session type;
   requesting a second key for re-encrypting the first encrypted change set, wherein the second key is stored and managed by a key manager external to the first computing device;
   re-encrypting the first encrypted change set to generate a second encrypted change set using the second key;
   using an index listing to mark byte indexes of a plurality of elements associated with the co-editable data object, the plurality of elements including, at least in part, pages and sections of the co-editable data object; and
   responsive to determining that a connection quality between the first computing device and the client meets a predetermined threshold or that the collaborative editing session is ending, revising a version identifier of the co-editable data object.

2. The computer-implemented method of claim 1 further comprising:
   requesting a version of the co-editable data object;
      receiving a first encrypted version of the co-editable data object encrypted with the first key from the client;
      requesting the second key for re-encrypting the first encrypted version of the co-editable data object; and
      re-encrypting the first encrypted version of the co-editable data object to generate a second encrypted version of the co-editable data object using the second key.

3. The computer-implemented method of claim 2 further comprising:
   receiving a request from the client for one or more of the second encrypted change set and the second encrypted version of the co-editable data object; and
   providing one or more of the second encrypted change set and the second encrypted version of the co-editable data object to the client.

4. The computer-implemented method of claim 2 further comprising:
  associating a version identifier with the second encrypted version of the co-editable data object; and
  marking the second encrypted change set with the version identifier associated with the second encrypted version of the co-editable data object re-encrypted by the first computing device.

5. The computer-implemented method of claim 4 further comprising:
  determining that a new version of the co-editable data object is necessary;
    providing the second encrypted change set marked with the first version identifier to the client when the marked second encrypted change set is necessary to complete the new version of the co-editable data object; and
  receiving the new version of the co-editable data object from the client.

6. The computer-implemented method of claim 1 wherein the second encrypted change set is marked with one or more position indicators that indicate the position of one or more changes within the co-editable data object.

7. The computer-implemented method of claim 6 further comprising:
  receiving a first encrypted index listing encrypted with the first key from the client, the first encrypted index listing defining one or more boundaries for the one or more position indicators within the co-editable data object;
  requesting the second key for re-encrypting the first encrypted index listing;
  re-encrypting the first encrypted index listing to generate a second encrypted index listing using the second key;
  providing the second encrypted index listing to the client; and
  receiving a request from the client for the second encrypted change set based upon, at least in part, the second encrypted index listing.

8. A computer program product comprising a non-transitory computer readable storage medium having a plurality of instructions stored thereon, which, when executed by a processor, cause the processor to perform operations including:
  receiving during a collaborative editing session, at a first computing device, a first encrypted change set for a co-editable data object from a client, the first encrypted change set being encrypted by a first key, wherein the collaborative session comprises two or more participants simultaneously accessing the co-editable data object during an electronic meeting or other communication session type;
  requesting a second key for re-encrypting the first encrypted change set, wherein the second key is stored and managed by a key manager external to the first computing device;
  re-encrypting the first encrypted change set to generate a second encrypted change set using the second key;
  using an index listing to mark byte indexes of a plurality of elements associated with the co-editable data object, the plurality of elements including, at least in part, pages and sections of the co-editable data object; and
  responsive to determining that a connection quality between the first computing device and the client meets a predetermined threshold or that the collaborative editing session is ending, revising a version identifier of the co-editable data object.

9. The computer program product of claim 8, further comprising instructions for: requesting a version of the co-editable data object;
  receiving a first encrypted version of the co-editable data object encrypted with the first key from the client;
  requesting the second key for re-encrypting the first encrypted version of the co-editable data object; and
  re-encrypting the first encrypted version of the co-editable data object to generate a second encrypted version of the co-editable data object using the second key.

10. The computer program product of claim 9, further comprising instructions for: receiving a request from the client for one or more of the second encrypted change set and the second encrypted version of the co-editable data object; and
  providing for one or more of the second encrypted change set and the second encrypted version of the co-editable data object to the client.

11. The computer program product of claim 9, further comprising instructions for: associating a version identifier with the second encrypted version of the co-editable data object; and
  marking the second encrypted change set with the version identifier associated with the second encrypted version of the co-editable data object re-encrypted by the first computing device.

12. The computer program product of claim 11, further comprising instructions for:
  determining that a new version of the co-editable data object is necessary;
  providing the second encrypted change set marked with the first version identifier to the client when the marked second encrypted change set is necessary to complete the new version of the co-editable data object; and
  receiving the new version of the co-editable data object from the client.

13. The computer program product of claim 8, wherein the second encrypted change set is marked with one or more position indicators that indicate the position of one or more changes within the co-editable data object.

14. The computer program product of claim 13, further comprising instructions for:
  receiving a first encrypted index listing encrypted with the first key from the client, the first encrypted index listing defining one or more boundaries for the one or more position indicators within the co-editable data object;
  requesting the second key for re-encrypting the first encrypted index listing;
  re-encrypting the first encrypted index listing to generate a second encrypted index listing using the second key;
  providing the second encrypted index listing to the client; and
  receiving a request from the client for the second encrypted change set based upon, at least in part, the second encrypted index listing.

15. A computing system comprising:
  a processor and a memory module coupled with the processor, the processor being configured for:
  receiving during a collaborative editing session, at a first computing device, a first encrypted change set for a co-editable data object from a client, the first encrypted change set being encrypted by a first key, wherein the collaborative session comprises two or more participants simultaneously accessing the co-editable data object during an electronic meeting or other communication session type;

requesting a second key for re-encrypting the first encrypted change set, wherein the second key is stored and managed by a key manager external to the first computing device;

re-encrypting the first encrypted change set to generate a second encrypted change set using the second key;

using an index listing to mark byte indexes of a plurality of elements associated with the co-editable data object, the plurality of elements including, at least in part, pages and sections of the co-editable data object; and responsive to determining that a connection quality between the first computing device and the client meets a predetermined threshold or that the collaborative editing session is ending, revising a version identifier of the co-editable data object.

16. The computing system of claim 15, wherein the processor is further configured for:

requesting a version of the co-editable data object;

receiving a first encrypted version of the co-editable data object encrypted with the first key from the client;

requesting the second key for re-encrypting the first encrypted version of the co-editable data object; and re-encrypting the first encrypted version of the co-editable data object to generate a second encrypted version of the co-editable data object using the second key.

17. The computing system of claim 16, wherein the processor is further configured for:

receiving a request from the client for one or more of the second encrypted change set and the second encrypted version of the co-editable data object; and providing for one or more of the second encrypted change set and the second encrypted version of the co-editable data object to the client.

18. The computing system of claim 16, wherein the processor is further configured for:

associating a version identifier with the second encrypted version of the co-editable data object; and marking the second encrypted change set with the version identifier associated with the second encrypted version of the co-editable data object re-encrypted by the first computing device.

19. The computing system of claim 18, wherein the processor is further configured for:

determining that a new version of the co-editable data object is necessary;

providing the second encrypted change set marked with the first version identifier to the client when the marked second encrypted change set is necessary to complete the new version of the co-editable data object; and receiving the new version of the co-editable data object from the client.

20. The computing system of claim of claim 15, wherein the second encrypted change set is marked with one or more position indicators that indicate the position of one or more changes within the co-editable data object.

\* \* \* \* \*